(12) United States Patent
Saunders et al.

(10) Patent No.: US 9,731,416 B1
(45) Date of Patent: Aug. 15, 2017

(54) LEGGED ROBOT PASSIVE FLUID-BASED ANKLES WITH SPRING CENTERING

(71) Applicant: Google Inc., Mountain View, CA (US)

(72) Inventors: John Aaron Saunders, Arlington, MA (US); Christopher Everett Thorne, Somerville, MA (US); Michael Patrick Murphy, Arlington, MA (US)

(73) Assignee: Google Inc., Mountain View, CA (US)

( * ) Notice: Subject to any disclaimer, the term of this patent is extended or adjusted under 35 U.S.C. 154(b) by 125 days.

(21) Appl. No.: 14/644,843

(22) Filed: Mar. 11, 2015

(51) Int. Cl.
| | | |
|---|---|---|
| *G05B 19/04* | (2006.01) | |
| *G05B 19/18* | (2006.01) | |
| *B25J 9/14* | (2006.01) | |
| *B62D 57/032* | (2006.01) | |

(52) U.S. Cl.
CPC .............. *B25J 9/14* (2013.01); *B62D 57/032* (2013.01); *Y10S 901/01* (2013.01); *Y10S 901/22* (2013.01)

(58) Field of Classification Search
CPC ...... F15B 11/048; F15B 13/021; F15B 21/08; F15B 2211/6336; F15B 2211/7053; F15B 2211/755; F15B 9/09; A61F 2/68; A61F 2002/704; A61F 2002/745; A61F 2002/764; A61F 2002/7645; A61F 2002/5003; A61F 2002/5004; A61F 2002/5072; A61F 2002/6818; A61F 2/60; A61F 2002/503; A61F 2002/5035; A61F 2002/5038; A61F 2002/5075; A61F 2002/74; B25J 19/0008; B25J 19/0091
See application file for complete search history.

(56) References Cited

U.S. PATENT DOCUMENTS

| | | | | |
|---|---|---|---|---|
| 6,443,993 B1* | 9/2002 | Koniuk | ................. | A61F 2/6607 623/24 |
| 8,626,326 B1* | 1/2014 | Theobald | ................. | B25J 9/144 60/413 |
| 8,657,886 B2* | 2/2014 | Clausen | ..................... | A61F 2/66 623/24 |
| 8,801,802 B2* | 8/2014 | Oddsson | ................... | A61F 2/68 623/24 |

(Continued)

OTHER PUBLICATIONS

Versluys et al., "Intelligent Prosthesis Actuated by Pleated Pneumatic Artificial Muscles: Objectives and Mechanical Concepts," http://mech.vub.ac.be/multibody/publications/full_texts/clawar.pdf, pp. 1-9.

*Primary Examiner* — Khoi Tran
*Assistant Examiner* — Jorge Peche
(74) *Attorney, Agent, or Firm* — McDonnell Boehnen Hulbert & Berghoff LLP

(57) ABSTRACT

An example robot includes a first hydraulic actuator cylinder connecting a first member to a second member, where the first hydraulic actuator cylinder comprises a first piston and a first chamber. A second hydraulic actuator cylinder connects the first member to the second member, where the second hydraulic actuator cylinder comprises a second piston and a second chamber. A valve system controls hydraulic fluid flow between a hydraulic supply line of pressurized hydraulic fluid, the first and second chambers, and a return line. A controller is configured to determine a gait state of the robot, and based on the determined gait state, provide a signal to the valve system.

15 Claims, 22 Drawing Sheets

SIDE VIEW OF ROBOT LEG

(56) References Cited

U.S. PATENT DOCUMENTS

| | | | | |
|---|---|---|---|---|
| 8,814,949 | B2* | 8/2014 | Gramnaes | A61F 2/64 623/27 |
| 8,828,095 | B2* | 9/2014 | Mosler | A61F 2/6607 602/27 |
| 8,852,292 | B2* | 10/2014 | Ragnarsdottir | A61F 2/68 623/24 |
| 8,870,967 | B2* | 10/2014 | Herr | A61F 2/60 601/5 |
| 8,986,397 | B2* | 3/2015 | Bedard | A61F 2/66 623/40 |
| 9,066,817 | B2* | 6/2015 | Gilbert | A61F 2/64 |
| 9,289,316 | B2* | 3/2016 | Ward | A61F 2/6607 |
| 9,333,097 | B2* | 5/2016 | Herr | A61F 2/60 |
| 9,358,137 | B2* | 6/2016 | Bedard | A61F 2/644 |
| 9,387,895 | B1* | 7/2016 | Theobald | B25J 5/005 |
| 9,526,636 | B2* | 12/2016 | Bedard | A61F 2/66 |
| 9,532,877 | B2* | 1/2017 | Holgate | A61F 2/30 |
| 2004/0255711 | A1* | 12/2004 | Takenaka | B25J 19/0008 74/490.01 |
| 2005/0011685 | A1* | 1/2005 | Takenaka | B25J 19/0091 180/8.6 |
| 2005/0077856 | A1* | 4/2005 | Takenaka | B25J 19/0091 318/568.12 |
| 2005/0120820 | A1* | 6/2005 | Takenaka | B25J 19/0091 74/490 |
| 2007/0123997 | A1* | 5/2007 | Herr | A61F 2/60 623/27 |
| 2007/0162152 | A1* | 7/2007 | Herr | A61F 2/60 623/24 |
| 2007/0193789 | A1* | 8/2007 | Takenaka | B25J 19/0091 180/8.1 |
| 2007/0273320 | A1* | 11/2007 | Shishido | B25J 19/0091 318/568.12 |
| 2008/0109115 | A1* | 5/2008 | Lim | B62D 57/032 700/258 |
| 2008/0202602 | A1* | 8/2008 | Flaim | B25J 15/0052 137/488 |
| 2008/0265821 | A1* | 10/2008 | Theobald | B25J 5/005 318/568.12 |
| 2009/0030530 | A1* | 1/2009 | Martin | A61B 5/4851 623/53 |
| 2010/0090638 | A1* | 4/2010 | Saunders | B25J 9/144 318/568.12 |
| 2010/0312363 | A1* | 12/2010 | Herr | A61F 2/64 623/39 |
| 2010/0324699 | A1* | 12/2010 | Herr | A61F 2/66 623/27 |
| 2013/0150980 | A1* | 6/2013 | Swift | A61F 2/68 623/24 |
| 2013/0173022 | A1* | 7/2013 | Arabian | A61F 2/6607 623/49 |
| 2014/0074243 | A1* | 3/2014 | Holgate | A61F 2/30 623/18.11 |
| 2015/0297366 | A1* | 10/2015 | Hashimoto | A61F 2/76 623/27 |
| 2016/0017899 | A1* | 1/2016 | Yang | F15B 15/103 623/14.13 |
| 2016/0023699 | A1* | 1/2016 | Saunders | G05D 16/2006 180/8.6 |
| 2016/0025114 | A1* | 1/2016 | Perkins | F15B 13/021 91/51 |
| 2016/0278947 | A1* | 9/2016 | Martin | A61F 2/68 |

* cited by examiner

US 9,731,416 B1

LEGGED ROBOT PASSIVE FLUID-BASED ANKLES WITH SPRING CENTERING

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic devices operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY

The present disclosure describes implementations that relate to legged robot passive ankles with spring centering. In a first example implementation, the present disclosure describes a robot. The robot includes a first hydraulic actuator cylinder connecting a first member to a second member, where the first hydraulic actuator cylinder contains a first piston and a first chamber. The robot further includes a second hydraulic actuator cylinder connecting the first member to the second member, where the second hydraulic actuator cylinder contains a second piston and a second chamber. The robot additionally includes a valve system configured to: (i) couple a supply line of pressurized hydraulic fluid to the first chamber, (ii) couple the supply line to the second chamber, (iii) couple the first chamber to a return line, and (iv) couple the second chamber to the return line. The robot also includes a controller configured to: (a) determine a gait state of the robot, and (b) based on the determined gait state, provide a signal to the valve system so as to select whether to (i) connect the first chamber to the supply line and connect the second chamber to the return line, (ii) connect the second chamber to the supply line and connect the first chamber to the return line, or (iii) connect both the first chamber and the second chamber to the return line.

In a second example implementation, the present disclosure describes performing the following operations: (i) determining, by a controller of a robot, a gait state of the robot, where a first hydraulic actuator cylinder connects a first member to a second member, where the first hydraulic actuator cylinder contains a first piston and a first chamber, where a second hydraulic actuator cylinder connects the first member to the second member, where the second hydraulic actuator cylinder contains a second piston and a second chamber, where the robot includes a valve system configured to: (a) couple a supply line of pressurized hydraulic fluid to the first chamber, (b) couple the supply line to the second chamber, (c) couple the first chamber to a return line, and (d) couple the second chamber to the return line, and (ii) based on the gait state, providing, by the controller, a signal to the valve system so as to select whether to (a) connect the first chamber to the supply line and connect the second chamber to the return line, (b) connect the second chamber to the supply line and connect the first chamber to the return line, or (c) connect both the first chamber and the second chamber to the return line.

In a third example implementation, the present disclosure describes a non-transitory computer readable medium having stored therein instructions that, when executed by a controller of a robot, cause the controller to perform operations in accordance with the second example implementation.

A fourth example implementation may include a system having means for performing operations in accordance with the second example implementation.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

The following detailed description describes various features and functions of the disclosed systems and methods with reference to the accompanying figures. The illustrative system and method implementations described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as aspects of one or more overall configurations, with the understanding that not all illustrated features are necessary for each configuration.

I. INTRODUCTION

A controller of a robot may be configured to operate the robot to move about on its legs or be in a stance position while maintaining its balance. An example robot may be a biped robot having two legs, a quadruped robot having four legs, among other possibilities. The controller may be configured to enable the robot to stand, walk, trot, or run in a given direction.

A leg of an example robot may have several members or links, such as a foot and a shin. The foot and shin may be connected at an ankle joint such that the ankle joints control an angle of the foot relative to the shin. In examples, ankle joints use hydraulic power to apply torque on the foot during liftoff, touchdown, and stance phases of a step taken by the robot. Disclosed herein are a hydraulic system of a robot and a method of controlling the hydraulic system to reduce power consumption of the robot. Foot and shin of a leg of a robot are used herein as examples for illustration only. The systems and methods described herein can be applied to any two members of the robot.

II. EXAMPLE ROBOTIC SYSTEM

Figure 1:
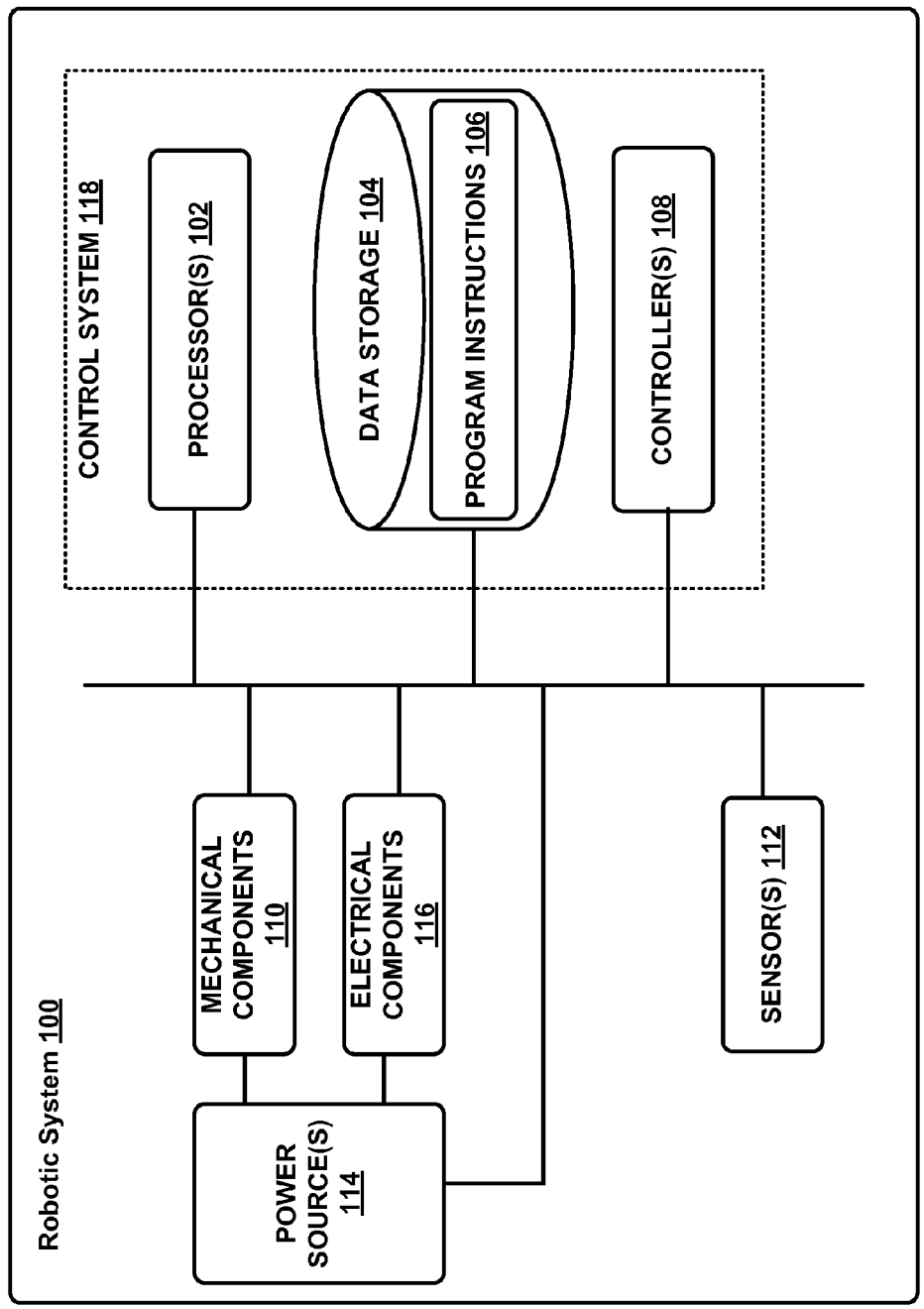
FIG. 1 illustrates a configuration of a robotic system, in accordance with an example implementation.

Referring now to the figures, FIG. 1 illustrates an example configuration of a robotic system, in accordance with an example implementation. The robotic system 100 represents an example robotic system configured to perform the implementations described herein. Additionally, the robotic system 100 may be configured to operate autonomously, semi-autonomously, and/or using directions provided by user(s), and may exist in various forms, such as a biped robot or a quadruped robot, among other examples. Furthermore, the robotic system 100 may also be referred to as a robotic device, mobile robot, or robot, among other designations.

As shown in FIG. 1, the robotic system 100 may include processor(s) 102, data storage 104, program instructions 106, and controller(s) 108, which together may be part of a control system 118. The robotic system 100 may also include sensor(s) 112, power source(s) 114, mechanical components 110, and electrical components 116. Note that the robotic system 100 is shown for illustration purposes, and may include more or less components within various examples. The components of robotic system 100 may be connected in any manner, including wired or wireless connections, etc. Further, in some examples, components of the robotic system 100 may be positioned on multiple entities rather than a single entity. Other example illustrations of robotic system 100 may exist.

Processor(s) 102 may operate as one or more general-purpose processors or special purpose processors (e.g., digital signal processors, application specific integrated circuits, etc.). The processor(s) 102 may be configured to execute computer-readable program instructions 106 that are stored in the data storage 104 and are executable to provide the operations of the robotic system 100 described herein. For instance, the program instructions 106 may be executable to provide functionality of controller(s) 108, where the controller(s) 108 may be configured to control the mechanical components 110 and the electrical components 116.

The data storage 104 may exist as various types of storage configured to hold information or instructions. For example, the data storage 104 may include or take the form of one or more computer-readable storage media that can be read or accessed by processor(s) 102. The one or more computer-readable storage media can include volatile and/or non-volatile storage components, such as electrical, optical, magnetic, organic or other memory or disc storage, which can be integrated in whole or in part with processor(s) 102. In some implementations, the data storage 104 can be implemented using a single physical device (e.g., one electrical, optical, magnetic, organic or other memory or disc storage unit), while in other implementations, the data storage 104 can be implemented using two or more physical devices, which may communicate via wired or wireless communication. Further, the data storage 104 may include additional information such as diagnostic data, configuration data, sensor data, environmental data, among other possibilities.

The control system 118 may include at least one controller 108, which may interface with the robotic system 100. The controller 108 may serve as a link between portions of the robotic system 100, such as a link between, the control system 118, mechanical components 110 and/or electrical components 116. In some instances, the controller 108 may serve as an interface between the control system 118 and another computing device. Further, the controller 108 may serve as an interface between the robotic system 100 and a user(s). In these cases, the controller 108 may include various components for communicating with other components of the robotic system 100, including a joystick(s), buttons, among others. The example interfaces and communications noted above may be implemented via a wired or wireless connection, or both. The controller 108 may perform other functions for the robotic system 100 as well. Other examples of controllers may exist.

The mechanical components 110 represent possible hardware of the robotic system 100 that may enable the robotic system 100 to perform physical operations. As a few examples, the robotic system 100 may include actuator(s), extendable leg(s) ("legs"), arm(s), wheel(s), one or more structured bodies for housing the control system 118, the electrical components 116, the power source 114, the sensors 112, and other mechanical components. The mechanical components 110 may depend on the design of the robotic system 100 and may also be based on the functions and/or tasks the robotic system 100 may be configured to perform. As such, depending on the operation and functions of the robotic system 100, different mechanical components 110 may be available for the robotic system 100 to utilize. In some examples, the robotic system 100 may be configured to add and/or remove mechanical components 110, which may involve assistance from a user and/or other robot. For example, the robotic system 100 may be initially configured with four legs, but may be altered by a user or the robotic system 100 to remove two of the four legs to operate as a biped. Other examples of mechanical components 110 may be included within some implementations.

Additionally, the robotic system 100 may include one or more sensor(s) 112 arranged to sense aspects of the robotic system 100. The sensor(s) 112 may include one or more force sensors arranged to measure load on various components of the robotic system 100. In an example, the sensor(s) 112 may include one or more force sensors on each leg. Such force sensors on the legs may measure the load on the actuators that move one or more members of the legs.

The sensor(s) 112 may further include one or more position sensors. Position sensors may sense the position of the actuators of the robotic system. In one implementation, position sensors may sense the extension, retraction, or rotation of the actuators on the legs of the robot. The sensor(s) 112 may further include one or more velocity and/or acceleration sensors. For instance, the sensor(s) 112 may include an inertial measurement unit (IMU). The IMU may sense velocity and acceleration in the world frame, with respect to the gravity vector. The velocity and acceleration of the IMU may then be translated to the robotic system, based on the location of the IMU in the robotic system and the kinematics of the robotic system. Other sensor(s) 112 are also possible, including proximity sensors, motion sensors, load sensors, touch sensors, depth sensors, ultrasonic range sensors, and infrared sensors, among other possibilities.

The sensor(s) 112 may provide sensor data to the processor(s) 102 to allow for appropriate interaction of the robotic system 100 with the environment as well as monitoring of operation of the systems of the robotic system 100. The sensor data may be used in evaluation of various factors for activation and deactivation of mechanical components 110 and electrical components 116 by controller 108 and/or a computing system of the robotic system 100.

The sensor(s) 112 may provide information indicative of the environment of the robot for the controller 108 and/or computing system to use to determine operations for the robotic system 100. For example, the sensor(s) 112 may capture data corresponding to the terrain of the environment or location of nearby objects, which may assist with environment recognition and navigation, etc. In an example configuration, the robotic system 100 may include a sensor system that includes a radio detection and ranging (RADAR) device, a light detection and ranging (LIDAR) device, a Sound Navigation and Ranging (SONAR) device, one or more cameras, a global positioning system (GPS) transceiver, and/or other sensors for capturing information of the environment of the robotic system 100. The sensor(s) 112 may monitor the environment in real-time and detect obstacles, elements of the terrain, weather conditions, temperature, and/or other parameters of the environment for the robotic system 100.

Further, the robotic system 100 may include other sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The sensor data provided by the sensors may enable the robotic system 100 to determine errors in operation as well as monitor overall functioning of components of the robotic system 100. For example, the control system 118 may use sensor data to determine a stability of the robotic system 100 during operations as well as measurements related to power levels, communication activities, components that require repair, among other information. As an example configuration, the robotic system 100 may include gyroscope(s), accelerometer(s), and/or other possible sensors to provide sensor data relating to the state of operation of the robot. Further, sensor(s) 112 may also monitor the current state of an operation, such as a gait of the robotic system 100. Other example uses for the sensor(s) 112 may exist as well.

Additionally, the robotic system 100 may also include one or more power source(s) 114 configured to supply power to various components of the robotic system 100. Among possible power systems, the robotic system 100 may include a hydraulic system, electrical system, batteries, and/or other types of power systems. As an example illustration, the robotic system 100 may include one or more batteries configured to provide charge to components that may receive charge via a wired and/or wireless connection. Within examples, components of the mechanical components 110 and electrical components 116 may each connect to a different power source or may be powered by the same power source. Components of the robotic system 100 may connect to multiple power sources 114 as well.

Within example configurations, any type of power source may be used to power the robotic system 100, such as a gasoline engine. Further, the power source(s) 114 may charge using various types of charging, such as wired connections to an outside power source, wireless charging, combustion, or other examples. Additionally, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system of the robotic system 100 may transfer a large amount of power through small tubes, flexible hoses, or other links between components of the robotic system 100. Such a hydraulic system may include pressure sources such as hydraulic pump(s) in addition to reservoirs and/or tanks. In examples where the robotic system 100 includes a hydraulic system, the sensor(s) 112 may include pressure sensors configured to measure pressure level of hydraulic fluid at various parts of the hydraulic systems. Other power sources may be included within the robotic system 100.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Figure 2:
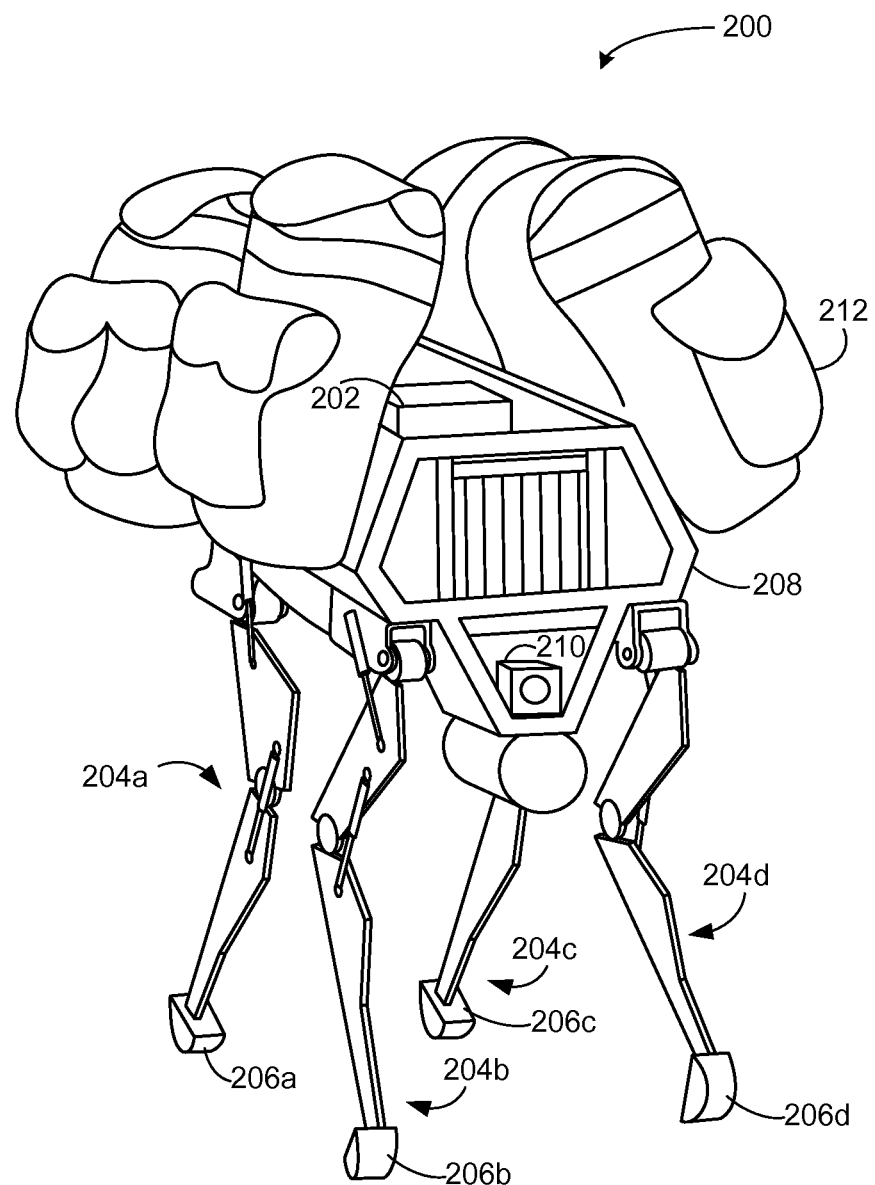
FIG. 2 illustrates a quadruped robot, in accordance with an example implementation.

FIG. 2 illustrates an example quadruped robot 200, according to an example implementation. Among other possible operations, the robot 200 may be configured to perform some of the features described herein during operation. The robot 200 includes a control system 202, and legs 204a, 204b, 204c, 204d connected to a body 208. Each leg may include a respective foot 206a, 206b, 206c, 206d that may contact a surface. The robot 200 may also include sensors (e.g., sensor 210) configured to provide sensor data to the control system 202 of the robot 200. Further, the robot 200 is illustrated carrying a load 212 on the body 208. Within other example implementations, the robot 200 may include more or less components and may additionally include components not shown in FIG. 2.

The robot 200 may be a physical representation of the robotic system 100 shown in FIG. 1 or may be based on other configurations. Thus, the robot 200 may include some or all of the modules and capabilities discussed in the context of FIG. 1. For instance, the control system 202 of the robot 200 may be the control system 118 or other types of controls systems. The control system 202 may include a computing system that may be made up of one or more computing devices configured to assist in various operations of the robot 200, which may include processing data and providing outputs based on the data. The control system 202 may process information provided by various systems of the robot 200 (e.g., a sensor system) or from other sources (e.g., a user, another robot, a server) and may provide instructions to the systems to operate in response.

Additionally, the control system 202 may monitor systems of the robot 200 during operation, to determine errors and/or monitor regular operation, for example. In some example configurations, the control system 202 may serve as a connection between the various systems of the robot 200 that coordinates the operations of the systems together to enable the robot 200 to perform operations. Further, although the operations described herein correspond to the control system 202 of a robot performing tasks, the control system 202 may be made of multiple devices, processors, controllers, and/or other entities configured to assist in the operation of the robot. Additionally, the control system 202 may operate using various types of memory and/or other components.

Although the robot 200 includes four legs 204a-204d in the illustration shown in FIG. 2, the robot 200 may include more or less legs within other examples. Further, the configuration, position, and/or structure of the legs 204a-204d may vary in example implementations. The legs 204a-204d enable the robot 200 to move and may be configured to operate in multiple degrees of freedom to enable different techniques of travel to be performed. In particular, the legs 204a-204d may enable the robot 200 to travel at various speeds through mechanically controlling the legs 204a-204d according to the mechanics set forth within different gaits. A gait is a pattern of movement of the limbs of an animal, robot, or other mechanical structure. As such, the robot 200 may navigate by operating the legs 204a-204d to perform various gaits. The robot 200 may use one or more gaits to travel within an environment, which may involve selecting a gait based on speed, terrain, the need to maneuver, and/or energy efficiency.

Further, different types of robots may use specific gaits due to differences in design that may prevent use of certain gaits. Although some gaits may have specific names (e.g., walk, trot, run, bound, gallop, etc.), the distinctions between gaits may overlap.

One or more systems of the robot 200, such as the control system 202, may be configured to operate the legs 204a-204d to cause the robot 200 to move. Additionally, the robot 200 may include other mechanical components, which may be attached to the robot 200 at various positions. The robot 200 may include mechanical arms, grippers, or other features. In some examples, the legs 204a-204d may have other types of mechanical features that enable control upon various types of surfaces that the robot may encounter, such as wheels, etc. Other possibilities also exist.

As part of the design of the example robot 200, the body 208 of the robot 200 connects to the legs 204a-204d and may house various components of the robot 200. As such, the structure of the body 208 may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body 208 as well as the legs 204a-204d may be developed using various types of materials, such as various metals or plastics. Within other examples, a robot may have a body with a different structure or made of other types of materials.

The sensor(s) 210 of the robot 200 may include various types of sensors, such as the camera or sensing system shown in FIG. 2. The sensor(s) 210 may be similar to the sensors 112, and are positioned on the front of the body 208, but may be placed at other positions of the robot as well. As described for the robotic system 100, the robot 200 may include a sensory system that includes force sensors, position sensors, fluid pressure sensors, IMUs, RADAR, LIDAR, SONAR, GPS, accelerometer(s), gyroscope(s), and/or other types of sensors. The sensor(s) 210 may be configured to measure parameters of the environment of the robot 200 as well as monitor internal operations of systems of the robot 200. As an example illustration, the robot 200 may include sensors that monitor the accuracy of its systems to enable the computing system to detect a system within the robot 200 that may be operating incorrectly. Other uses of the sensor(s) 210 may be included within examples.

The load 212 carried by the robot 200 may represent various types of cargo that the robot 200 may transport. The load 212 may also represent external batteries or other types of power sources (e.g., solar panels) that the robot 200 may utilize. The load 212 represents one example use for which the robot 200 may be configured. The robot 200 may be configured to perform other operations as well.

Additionally, as shown with the robotic system 100, the robot 200 may also include various electrical components that may enable operation and communication between the mechanical features of the robot 200. Also, the robot 200 may include one or more computing systems that include controllers and one or more processors configured to perform various operations, including processing inputs to provide control over the operation of the robot 200. The computing system may include additional components, such as various types of storage and a power source, etc.

During operation, the computing system may communicate with other systems of the robot 200 via wired or wireless connections and may further be configured to communicate with one or more users of the robot 200. As one possible illustration, the computing system may receive an input from a user indicating that the user wants the robot to perform a particular gait in a given direction. The computing system may process the input and may perform an operation that may cause the systems of the robot 200 to perform the requested gait. Additionally, the robot's electrical components may include interfaces, wires, busses, and/or other communication links configured to enable systems of the robot 200 to communicate.

Furthermore, the robot 200 may communicate with one or more users and/or other robots via various types of interfaces. In an example implementation, the robot 200 may receive input from a user via a joystick or similar type of interface. The computing system may be configured to measure the amount of force and other possible information from inputs received from a joystick interface. Similarly, the robot 200 may receive inputs and communicate with a user via other types of interfaces, such as a mobile device or a microphone. The computing system of the robot 200 may be configured to process various types of inputs.

Figure 3:
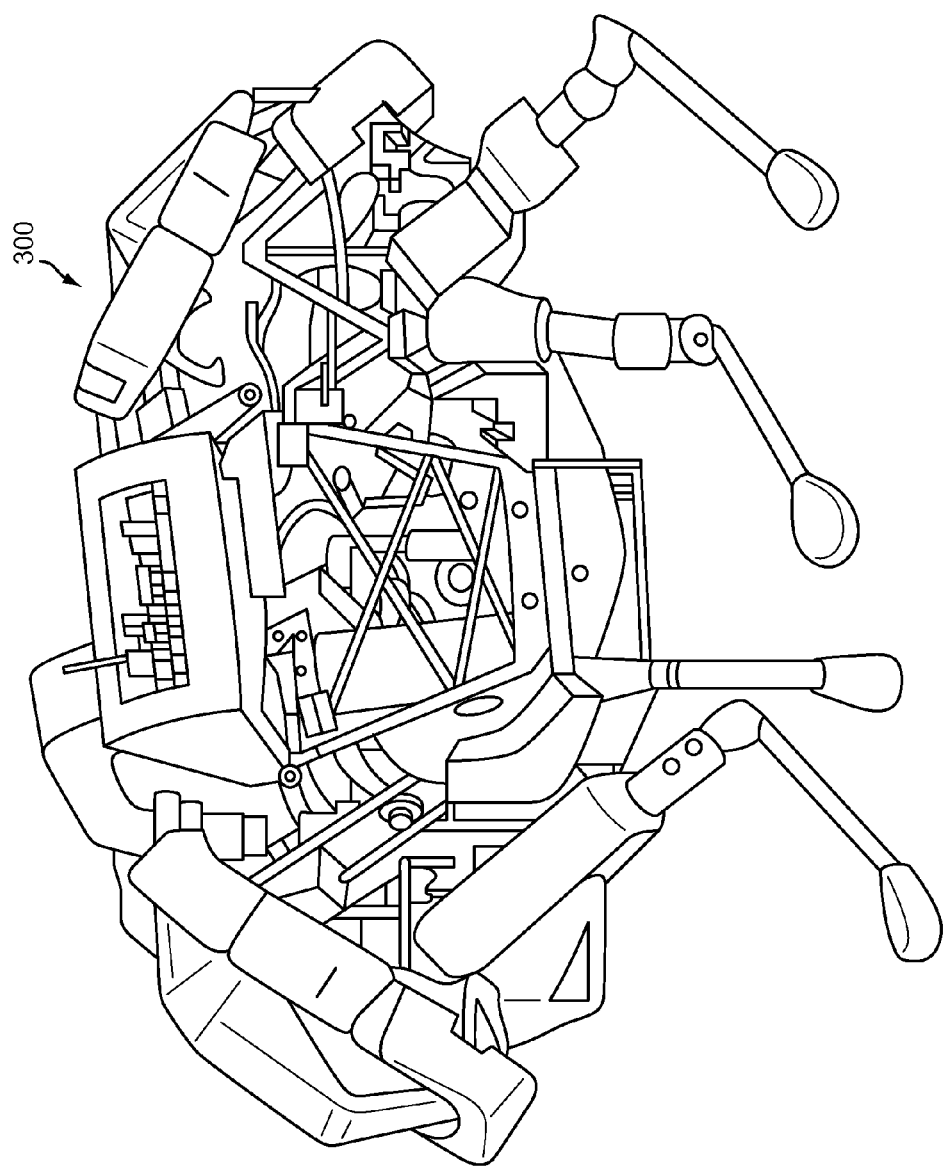
FIG. 3 illustrates another quadruped robot, in accordance with an example implementation.

FIG. 3 illustrates another quadruped robot 300 according to an example implementation. Similar to robot 200 shown in FIG. 2, the robot 300 may correspond to the robotic system 100 shown in FIG. 1. The robot 300 serves as another possible example of a robot that may be configured to perform some of the implementations described herein.

Figure 4:
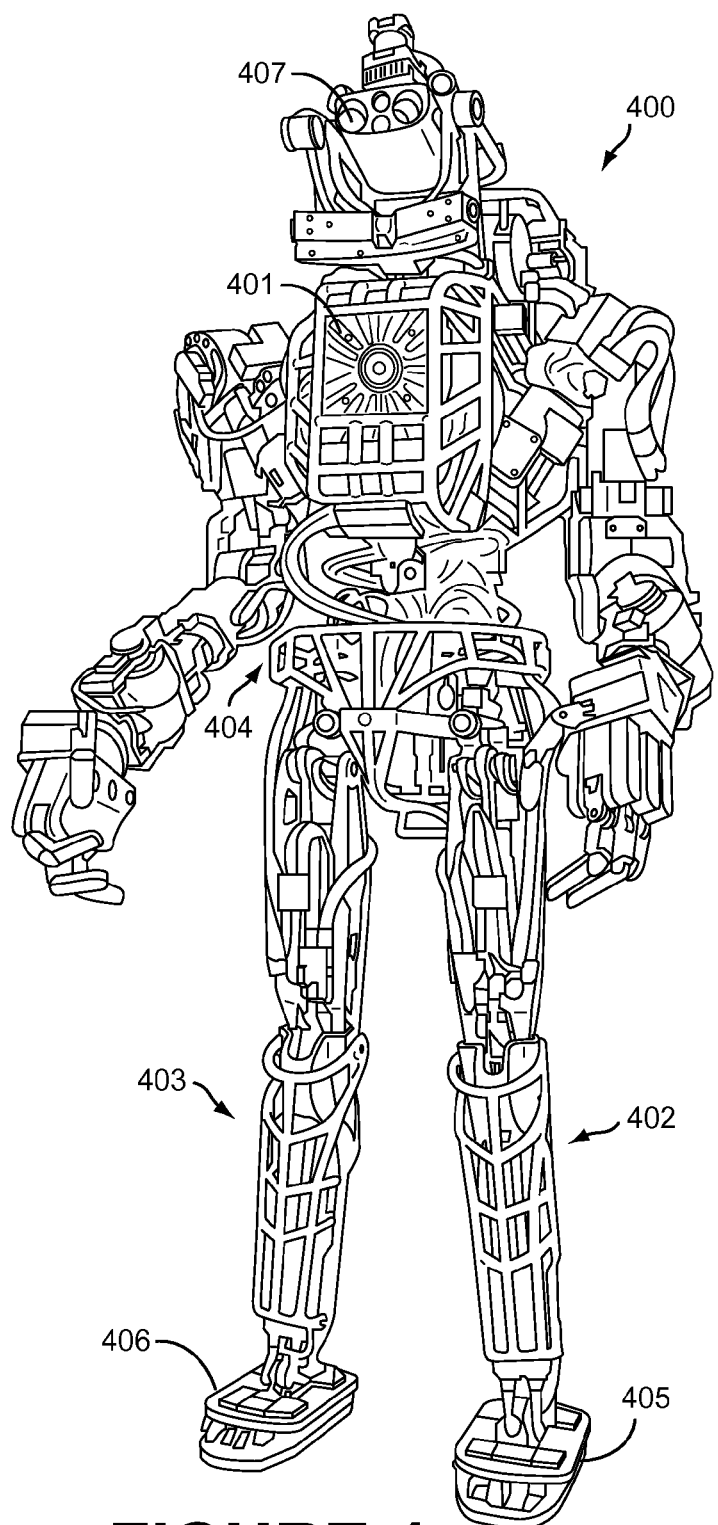
FIG. 4 illustrates a biped robot, in accordance with an example implementation.

FIG. 4 illustrates a biped robot 400 according to another example implementation. Similar to robots 200 and 300 shown in FIGS. 2 and 3, the robot 400 may correspond to the robotic system 100 shown in FIG. 1, and may be configured to perform some of the implementations described herein. The robot 400 may include more or less components than those shown in FIG. 2 and discussed with respect to the robot 200. For example, the robot 400 may include a control system 401 and legs 402, 403 connected to a body 404. Each leg may include a respective foot 405, 406, that may contact the ground surface. The robot 400 may also include sensors (e.g., sensor 407) configured to provide sensor data to the control system 401 of the robot 400.

III. EXAMPLE HYDRAULIC SYSTEM FOR ROBOT ANKLE CONTROL

Figure 5A:
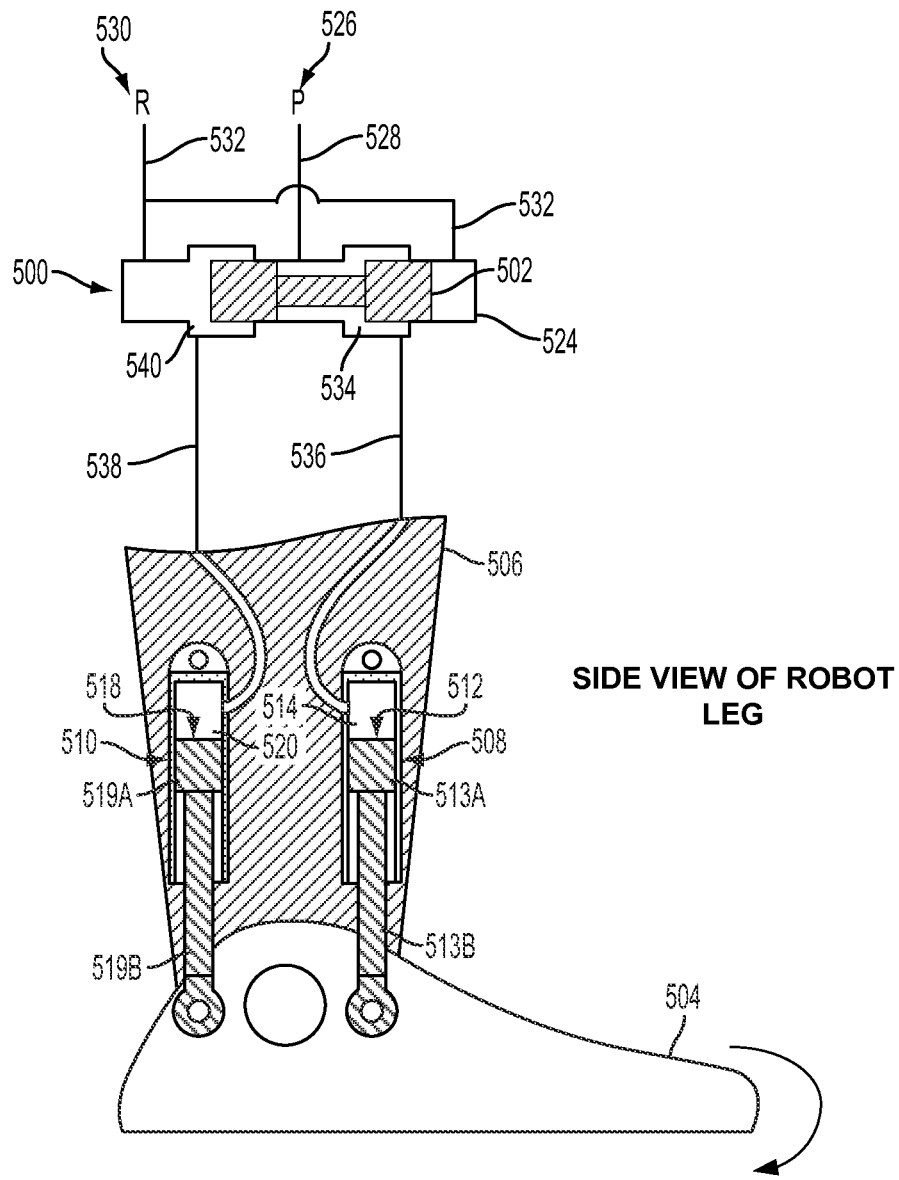
FIGS. 5A-5B illustrate a hydraulic circuit including a valve having a spool configured to move linearly, in accordance with an example implementation.
Figure 5B:
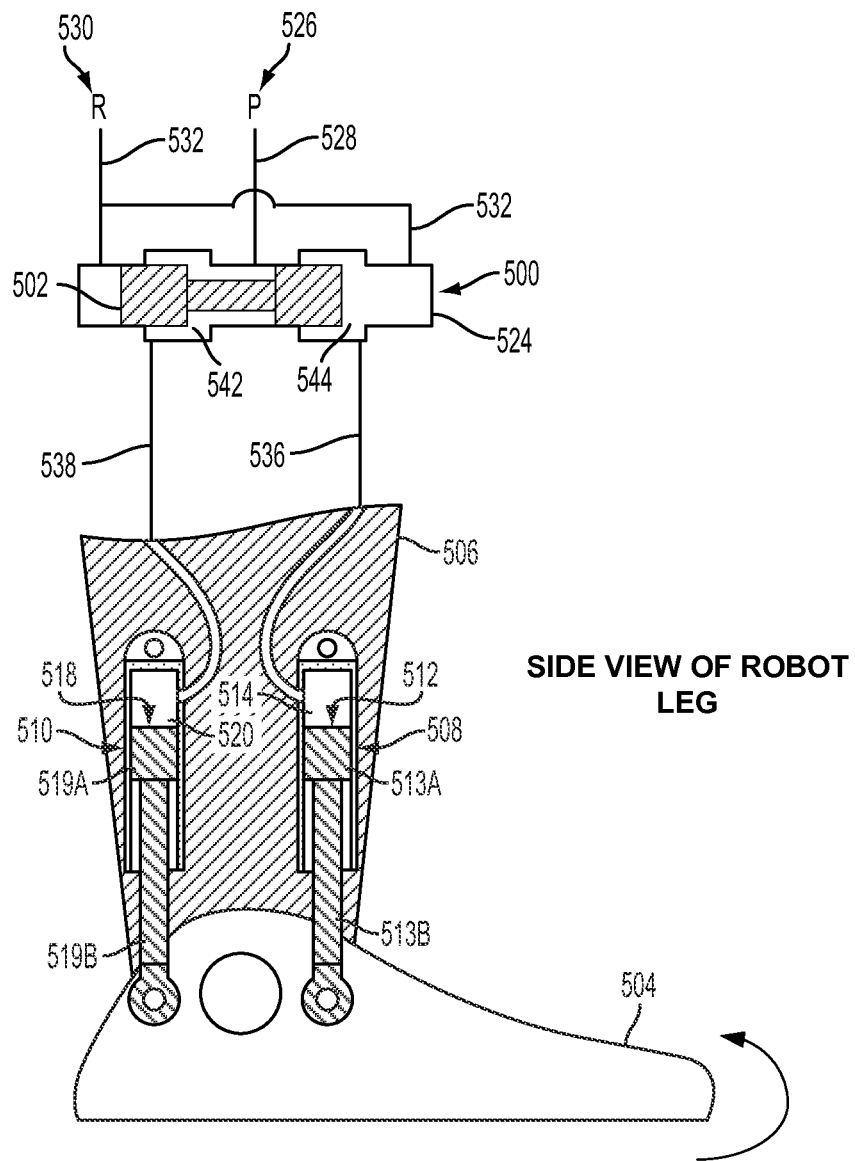

FIGS. 5A-5B illustrate a hydraulic circuit including a valve 500 having a spool 502 configured to move linearly, in accordance with an example implementation. The valve 500 depicted in FIGS. 5A-5B is a four-way spool valve controlling position of a foot 504 of a robot relative to a shin 506 of the robot. The valve 500 can be an electrically operated valve that controls how hydraulic fluid is ported to hydraulic actuator cylinders 508 and 510. The hydraulic actuator cylinder 508 includes a piston 512 slidably accommodated in the hydraulic actuator cylinder 508. The piston 512 includes a piston head 513A and a rod 513B extending from the piston head 513A along a central axis direction of the hydraulic actuator cylinder 508. The hydraulic actuator cylinder 508 includes a chamber 514. Similarly, the hydraulic actuator cylinder 510 includes a piston 518 slidably accommodated in the hydraulic actuator cylinder 510. The piston 518 includes a piston head 519A and a rod 519B extending from the piston head 519A along a central axis direction of the hydraulic actuator cylinder 510. The hydraulic actuator cylinder 510 includes a chamber 520.

The hydraulic actuator cylinders 508 and 510 are each single acting cylinders, i.e., the valve 500 can power a respective cylinder in a single direction. In other examples, however, the single-acting hydraulic actuator cylinders 508 and 510 can be replaced by a double-acting hydraulic actuator cylinder that can be powered in two directions. In the example implementation shown in FIGS. 5A-5B, motion of either of the pistons 512 or 518 in a given direction is accompanied by motion of the other piston in an opposite direction, resulting in rotation of the foot 504 relative to the shin 506.

The spool 502 is slidably accommodated within valve body 524 of the valve 500. An electric solenoid, a stepper motor, a hydraulic actuator, or any other actuation device may be used for moving the spool 502 within the valve body 524. Linear position of the spool 502 controls hydraulic fluid flow from a pressure source 526 through a hydraulic supply line 528 to one of the two chambers 514 and 520, and controls flow of hydraulic fluid forced out from the other chamber to a low pressure reservoir 530 through a hydraulic return line 532. The pressure source 526 may contain pressurized fluid, and the reservoir 530 may contain fluid having pressure lower than that of the pressurized fluid of pressure source 124. As an example for illustration, the pressure source 526 may be a pump driven by a motor or an engine and configured to supply hydraulic fluid at a pressure of 3000 pounds per square inch (psi), and the reservoir 530 may include hydraulic fluid at a pressure of 100 psi. These pressure levels are examples only, and other pressure levels are contemplated as well.

Specifically, FIG. 5A illustrates controlling the valve 500 to cause the foot 504 to rotate clockwise relative to the shin 506. As shown in FIG. 5A, the spool 502 is shifted to a given linear position so as to allow hydraulic fluid flow from the pressure source 526 through the hydraulic supply line 528, an opening 534, and a hydraulic line 536 to the chamber 514. Such high pressure fluid flow into the chamber 514 pushes against the piston head 513A of the piston 512, causes the piston 512 to move in a downward direction, and causes the chamber 514 to expand. Motion of the piston 512 downward causes rotation of the foot 504 in a clockwise direction, and thus causes the piston 518 to move upward. Upward motion of the piston 518 causes the chamber 520 to contract, and forces hydraulic fluid out from the chamber 520 through a hydraulic line 538 and an opening 540 to flow through the hydraulic return line 532 to the reservoir 530.

FIG. 5B illustrates controlling the valve 500 to cause the foot 504 to rotate counter-clockwise relative to the shin 506. To cause the foot 504 to rotate in a counter-clockwise direction, the spool 502 can be shifted to a different linear position, as shown in FIG. 5B, so as to allow hydraulic fluid flow from the pressure source 526 through the hydraulic supply line 528, an opening 542, and the hydraulic line 538 to the chamber 520. Hydraulic fluid flow into the chamber 520 pushes against the piston head 519A of the piston 518, causes the piston 518 to move in a downward direction, and causes the chamber 520 to expand. Motion of the piston 518 downward causes rotation of the foot 504 in a counter-clockwise direction, and thus causes the piston 512 to move upward. Upward motion of the piston 512 causes the chamber 514 to contract, and forces hydraulic fluid out from the chamber 514 through the hydraulic line 536 and an opening 544 to flow through the hydraulic return line 532 to the reservoir 530.

Motion of the foot 504 relative to the shin 506 consumes hydraulic power as the motion requires high pressure fluid supplied by the pressure source 526. Even when the robot is in stance position with the foot 504 on the ground, the robot may consume hydraulic power to maintain stance position of the robot. For instance, if any disturbance force causes the robot to lean forward while the robot is in stance position, the controller may initiate counter-clockwise motion of the foot 504 to maintain balance of the robot and its stance position. Similarly, if any disturbance force causes the robot to lean backward while the robot is in stance position, the controller may initiate clockwise rotation of foot 504 to maintain balance of the robot and its stance position. Such disturbances may occur, for example, if the robot is standing on a rough or uneven surface.

Further, when the robot is walking or running, each leg of the robot goes through several phases for each step the robot takes. For instance, in one phase, the foot 504 may be on the surface on which the robot is moving and may be pushing against the surface so as to liftoff the leg from the surface. In another phase, after liftoff, the foot 504 may be in a swing state. In still another phase, the foot 504 may touch down on the surface. Using the system illustrated in FIGS. 5A-5B, the robot consumes hydraulic power during liftoff, swing, and touchdown phases of a step. Particularly, hydraulic power may be consumed during swing state to maintain posture of the foot 504 (i.e., control angle between the foot 504 and the shin 506) between liftoff and touchdown, even though the foot 504 is not required to perform an active function.

IV. EXAMPLE HYDRAULIC SYSTEM FOR EFFICIENT CONTROL OF AN ANKLE JOINT

FIGS. 6A-6I illustrate a hydraulic circuit having a valve system 600 for efficient control of a robot member, in accordance with an example implementation. The valve system 600 includes at least four variable orifices 602, 604, 606, and 608. A controller of the robot, such as the controller 108, may be configured to partially open, fully open, or close each of the orifices 504, 506, 508, and 510 by way of respective actuators (e.g., electric actuators such as solenoids, or hydraulic actuators).

In an example, if motion of the robot requires a clockwise rotation of the foot 504 (e.g., to initiate liftoff of the foot 504 from a surface), the controller may open the orifice 602 and the orifice 606, and close the orifice 604 and the orifice 608 to block flow therethrough. In such configuration, hydraulic fluid flows from the pressure source 526 through the hydraulic supply line 528 and the orifice 602. The hydraulic fluid then flows through the hydraulic line 536 to the chamber 514 because the orifice 608 is closed. Hydraulic fluid flowing into the chamber 514 pushes against the piston head 513A of the piston 512, causes the piston 512 to move in a downward direction, and causes the chamber 514 to expand. Motion of the piston 512 downward causes rotation of the foot 504 in a clockwise direction, and causes the piston 518 to move upward. Upward motion of the piston 518 causes the chamber 520 to contract, and forces hydraulic fluid out from the chamber 520 through the hydraulic line 538 and the orifice 606, because the orifice 604 is closed, through the hydraulic return line 532 to the reservoir 530.

On the other hand, if motion of the robot requires a counter-clockwise rotation of the foot 504, the controller may open the orifice 604 and the orifice 608, and close the orifice 602 and the orifice 606 to block flow therethrough. In such configuration, hydraulic fluid flows from the pressure source 526 through the orifice 604 and the hydraulic line 538, because the orifice 606 is closed, to the chamber 520. Hydraulic fluid flow into the chamber 520 pushes against the piston head 519A of the piston 518, causes the piston 518 to move in a downward direction, and causes the chamber 520 to expand. Motion of the piston 518 downward causes rotation of the foot 504 in a counter-clockwise direction, and causes the piston 512 to move upward. Upward motion of the piston 512 causes the chamber 514 to contract, and forces hydraulic fluid out from the chamber 514 through the hydraulic line 536 and the orifice 608, because orifice 602 is closed, through the hydraulic return line 532 to the reservoir 530.

Further, the valve configuration 600 allows for minimal or no power consumption when the foot 504 is not required to perform an active function (e.g., when the foot 504 is in swing state between liftoff and touchdown, or when the robot is required to maintain balance while standing on a given surface). For instance, in swing state, the controller may close the orifice 602 and the orifice 604, and open the orifice 606 and the orifice 608. FIG. 6B schematically illustrates such a configuration where the orifice 606 and the orifice 608 are shown (i.e., are active), while the orifice 602 and the orifice 604 are not shown (i.e., are inactive or closed). In this configuration, the robot does not use high pressure fluid from the pressure source 526 (as the orifice 602 and the orifice 604 are closed), and thus does not consume hydraulic power. Instead, both the chamber 514 and the chamber 520 are connected to the hydraulic return line 532 via the orifice 608 and the orifice 606, respectively.

In one example, the controller may fully open both the orifice 606 and the orifice 608, and in this example, the foot 504 may be referred to as operating in coasting mode. In another example, the controller may only partially open the orifice 606 to restrict flow out of the chamber 520 and limit undesired motion of the foot 504 to maintain the posture of the foot 504 during swing state. In this case, the foot 504 may be referred to as operating in braking mode. In braking mode, the hydraulic system exerts negative work as it prevents, or slows down, motion of the foot 504 by converting kinetic energy of the foot 504 into heat resulting from restricting flow of hydraulic flow through the orifice 606.

When the foot 504 operates in the coasting mode or braking mode, disturbances to the foot 504 may cause slight motions of the pistons 512 and 518. Thus, fluid may be drained, or pushed out, from either of the chambers 514 or 118 to the reservoir 530, and hydraulic fluid may be supplied from the reservoir 530 to the other chamber. As a specific example, assume that the robot leg having the foot 504 and the shin 506 is in swing state (e.g., between liftoff and touchdown) of a step. In this example, while the foot 504 is in the air, gravity exerts downward force on the foot 504, which may cause slight clockwise rotation of the foot 504. In this case, the piston 518 may move slightly upward, and hydraulic fluid may be drained or pushed through the hydraulic line 538 and the orifice 606, through the hydraulic return line 532 to the reservoir 530. In response to motion of the piston 518 upward, the piston 512 moves slightly downward and the reservoir 530 or the hydraulic return line 532 provides hydraulic fluid through the orifice 608 and the hydraulic line 536 to fill the chamber 514 and prevent cavitation (i.e., to prevent pressure of fluid in the chamber 514 to drop below a threshold pressure level).

As the robot initiates surface contact, i.e., as the foot 504 touches down on the surface, a heel of the foot 504 may touch the surface first, and the foot 504 may not be aligned with a plane of the surface. The controller may operate the foot 504 in coasting or braking mode to rotate the foot 504 clockwise and align the foot 504 with the plane of the surface. Then, when touchdown is complete and the foot 504 is aligned with the plane of the surface, the controller may switch the hydraulic system to an active mode again to initiate liftoff, where the robot uses high pressure fluid to actively control the foot 504. Thus, the controller may be configured to switch the hydraulic system between the active mode and coasting/braking mode based on gait state of the robot (i.e., based on the phase of a step that the robot is taking). In this manner, the controller saves energy when active power is not required to control foot the 504, e.g., during swing state of a step.

Similarly, when the robot is standing on a rough surface that distorts orientation of the foot 504 (e.g., the foot 504 is forced to move clockwise or counter-clockwise to conform to an uneven surface), the controller may open the orifice 606 and the orifice 608, while closing the orifice 602 and the orifice 604, to accommodate such distortions without requiring high pressure fluid.

Figure 6A:
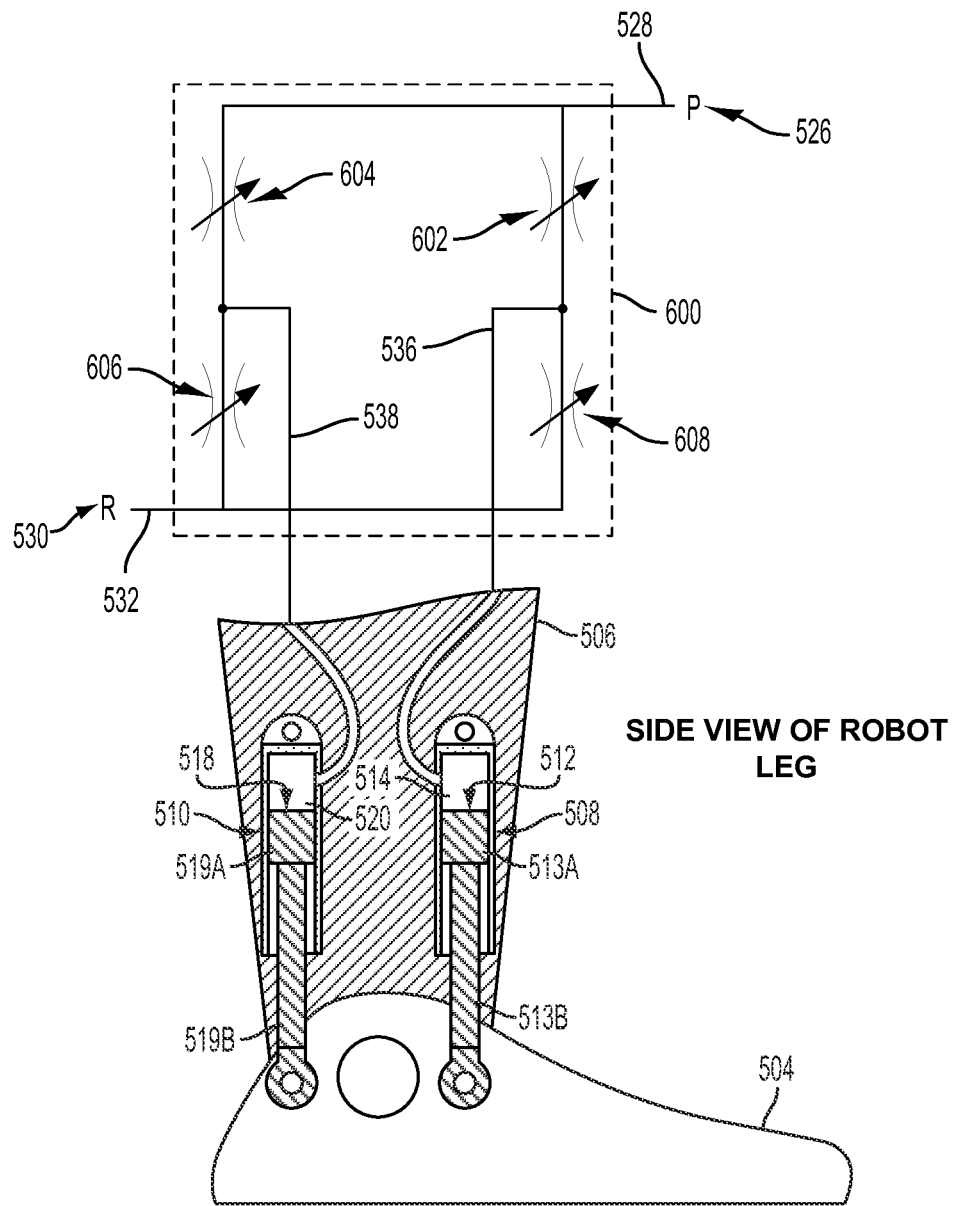
FIGS. 6A-6I illustrate a hydraulic circuit having a valve system for efficient control of a robot member, in accordance with an example implementation.
Figure 6B:
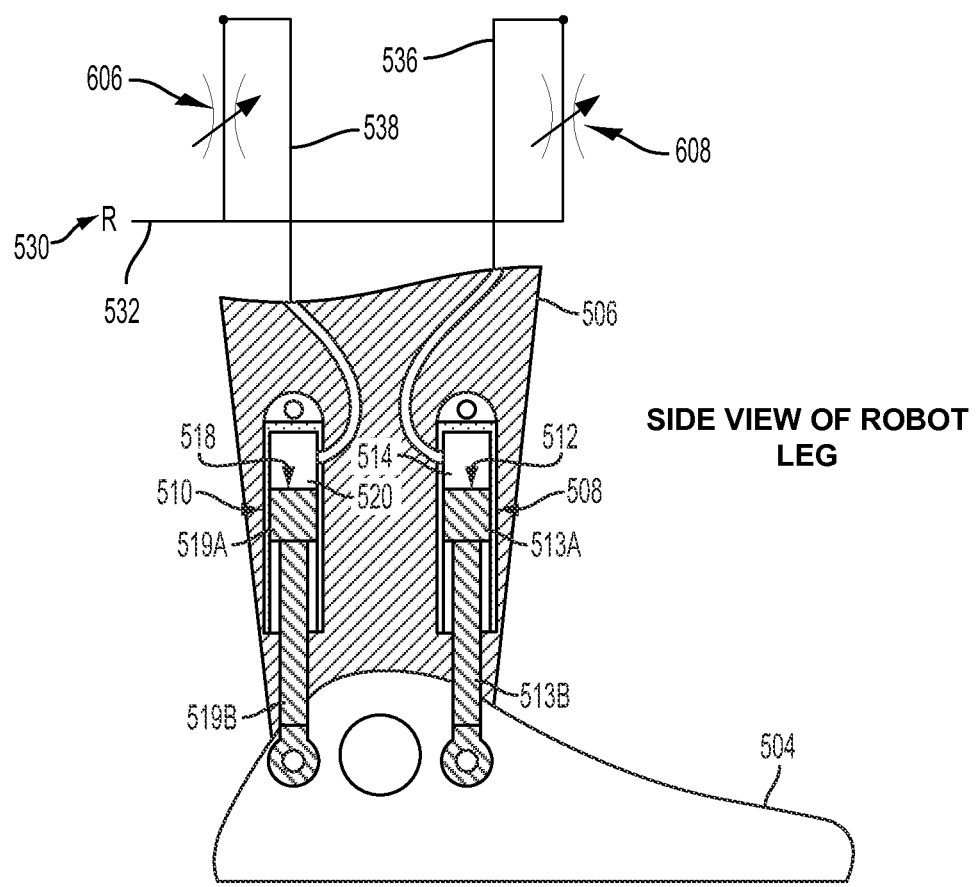
Figure 6C:
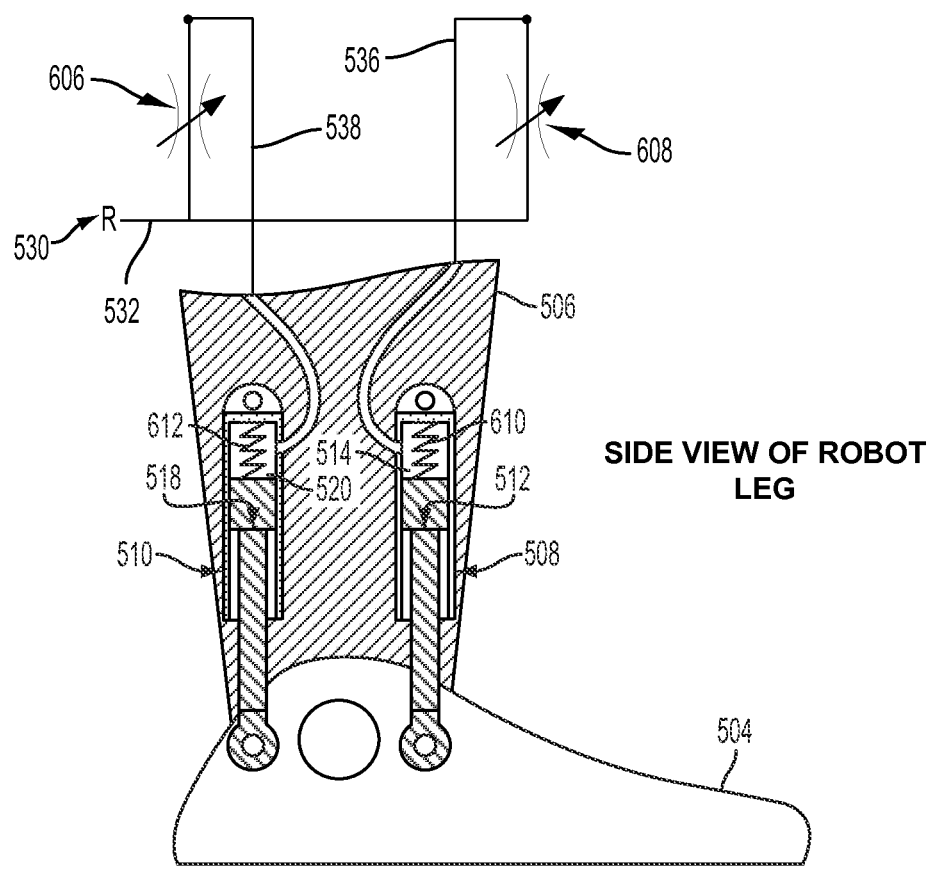

In an example implementation shown in FIG. 6C, a spring 610 is disposed within the chamber 514 of the hydraulic actuator cylinder 508. The spring 610 is attached to the inside of the hydraulic actuator cylinder 508 and the piston 512 and is configured to act against the piston 512. Similarly, a spring 612 is disposed within the chamber 520 of the hydraulic actuator cylinder 510. The spring 612 is attached to the inside of the hydraulic actuator cylinder 510 and the piston 518 and is configured to act against the piston 518.

The springs 610 and 612 may be configured to keep the foot 504 in a particular (e.g., level) orientation during swing state. Each of the spring 610 and the spring 612 has a respective equilibrium position (e.g., neither extended nor compressed) that corresponds to the particular orientation of the foot 504 (e.g., flat orientation of foot 504). In this configuration, in addition to controlling the orifice 606 and the orifice 608, the springs 610 and 612 can exert forces on the pistons 512 and 518, respectively. Such forces maintain or restore the particular orientation of the foot 504 during the swing state. For example, gravity disturbance may cause slight clockwise rotation of the foot 504 as described above, and thus causes the spring 610 to be extended relative to its equilibrium position, and causes the spring 612 to be compressed relative to its equilibrium position. Thus, to restore its equilibrium position, the spring 610 will exert an upward (pulling) force on the piston 512. Also, to restore its equilibrium position, the spring 612 will exert a downward (pushing) force on the piston 518. These forces exerted by the springs 610 and 612 seek to restore the pistons 512 and 518 to respective positions corresponding to equilibrium position of the springs 610 and 612. Thus, the forces restore the particular orientation of the foot 504. Such configuration avoids using high pressure fluid to restore the particular orientation of the foot 504, and thus saves power.

Figure 6D:
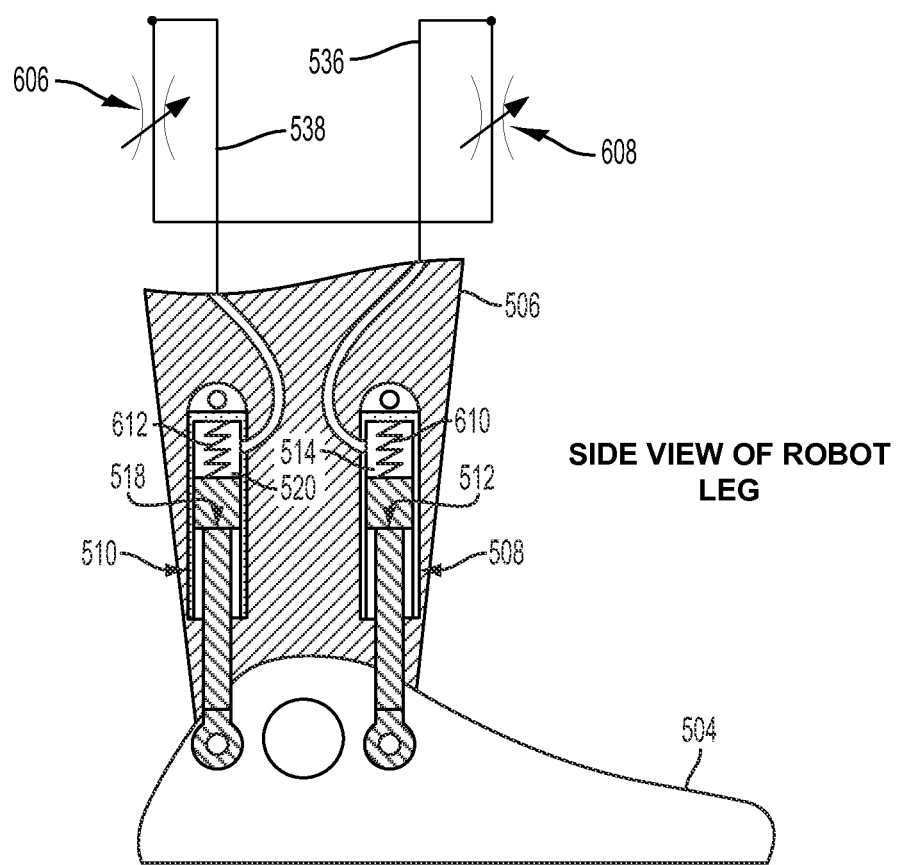

In an example implementation shown in FIG. 6D, the valve system controlling the hydraulic actuator cylinders 508 and 510 may include only the orifices 606 and 608, and might not be connected to a hydraulic supply line or a hydraulic return line. In this example, assuming that a gravity disturbance causes slight clockwise rotation of the foot 504 as described above, hydraulic fluid drained from or pushed out of the chamber 520 may flow to the chamber 514 rather than being drained to a reservoir. Additionally, as described with respect to FIG. 6C, the spring 610 disposed within the chamber 514 and the spring 612 disposed within the chamber 520 may be configured to keep the foot 504 in the particular orientation during swing state of the leg. Thus, in the configuration shown in FIG. 6D, high pressure fluid is not used to restore the particular orientation of foot the 504.

Figure 6E:
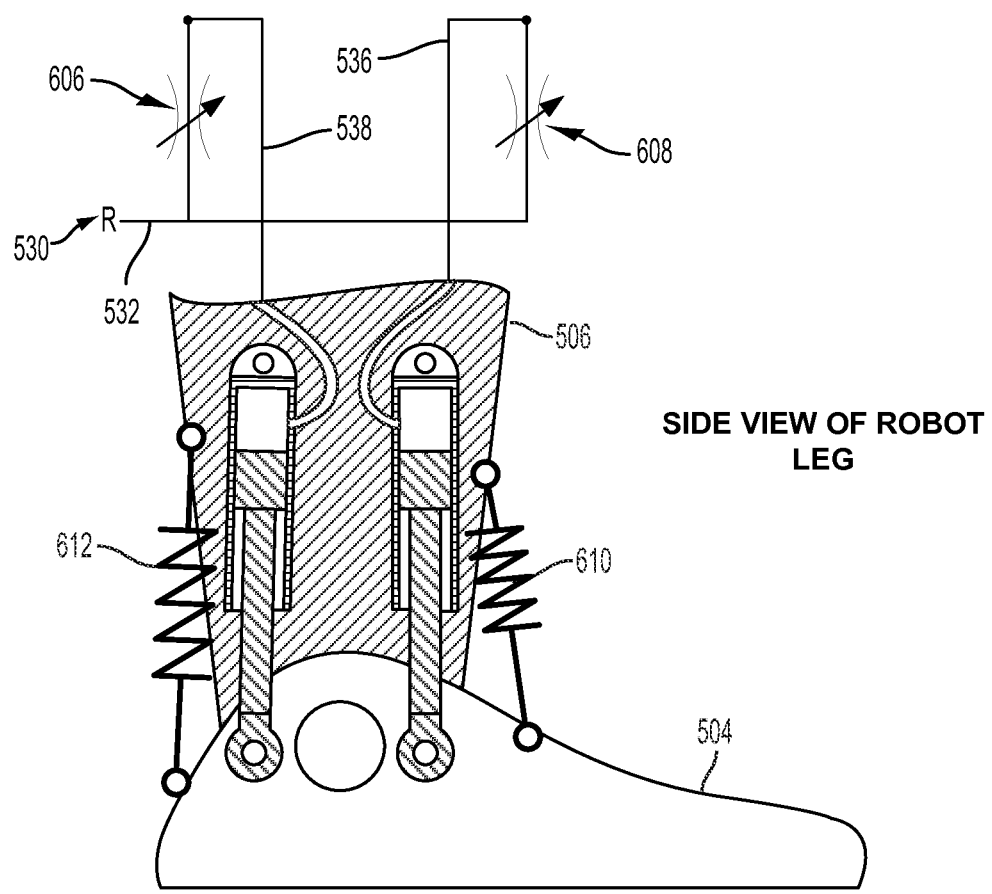

Other spring configurations are possible. For example, FIG. 6E illustrates the springs 610 and 612 disposed outside the hydraulic actuator cylinders 508 and 510 and directly connecting the shin 506 to the foot 504.

Figure 6F:
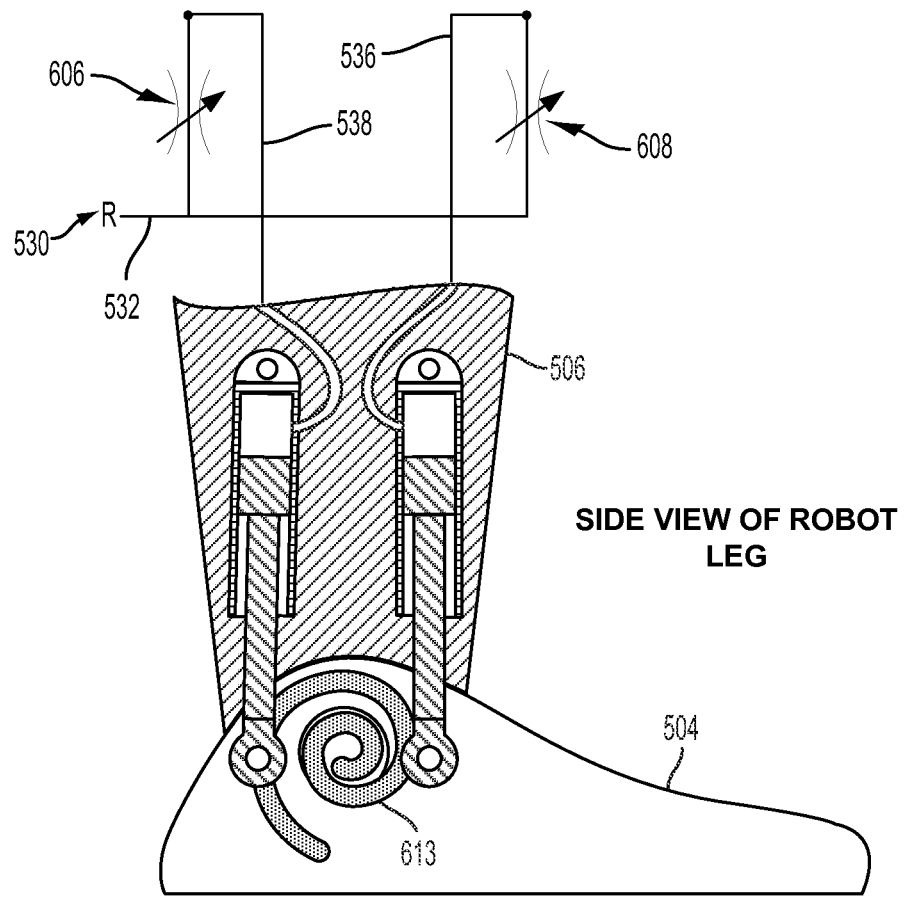

As another example configuration, FIG. 6F illustrates using a torsional spring 613 mounted at a joint connecting the shin 506 to the foot 504. The torsional spring 613 may replace the two linear springs 610 and 612. The torsional spring 613 has an equilibrium position that corresponds to the particular orientation of the foot 504 (e.g., flat orientation of foot 504). In this configuration, in addition to controlling the orifice 606 and the orifice 608, the spring 613 can exert forces on the foot 504. Such forces maintain or restore the particular orientation of the foot 504 if the foot 504 rotates clockwise or counter-clockwise (e.g., during the swing state). Rotation of the foot 504 causes the spring 613 to seek to restore its equilibrium position, and thus causes the spring 613 exerts a force on the foot 504 to cause the foot 504 to restore its particular orientation corresponding to the equilibrium position of the torsional spring 613. Other spring configurations are also possible. Therefore, as mentioned above with respect to FIGS. 6C and 6D, high pressure fluid is not used to restore the particular orientation of foot the 504.

It has been observed that a reduction of 35% in consumed power for a rough ground walking gait is achieved when braking mode is implemented. Further improvements are contemplated with implementing coasting mode and the springs illustrated in FIGS. 6C-6F.

FIGS. 6B-6F illustrate configurations where the orifice 606 and the orifice 608 are active (opened), while the orifice 602 and the orifice 604 are inactive or closed. However, in other examples, efficient control of the robot may be achieved by closing the orifice 606 and the orifice 608, while opening the orifice 602 and the orifice 604. Such configuration is shown in FIG. 6G.

Figure 6G:
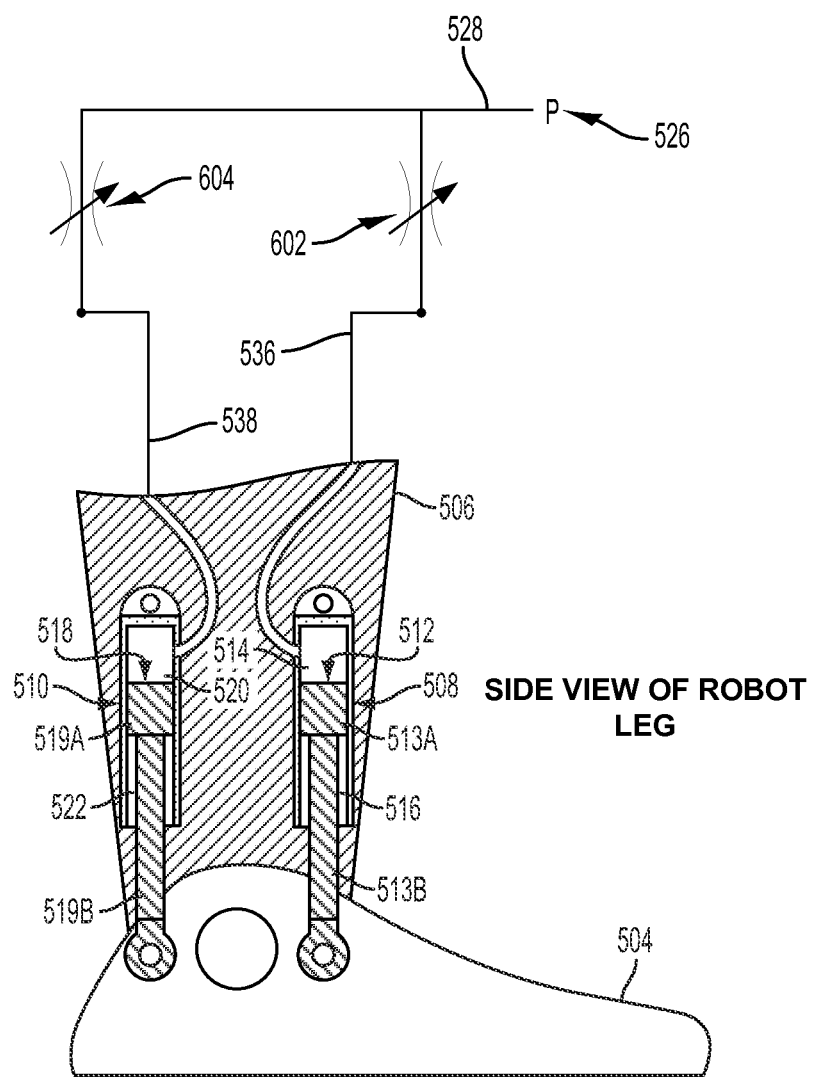

Particularly, in the configuration depicted in FIG. 6G, both the chamber 514 and the chamber 520 are connected to the hydraulic supply line 528 via the orifice 602 and the orifice 604, respectively. In this case, the foot 504 may be referred to as operating in coasting mode in this configuration as well. Disturbances to the foot 504 may cause slight motions of the pistons 512 and 518. Thus, fluid may be drained, or pushed out, from either of the chambers 514 or 118 to the hydraulic supply line 528, and hydraulic fluid may be supplied from the hydraulic supply line 528 to the other chamber. As a specific example, assume that the robot leg having the foot 504 and the shin 506 is in swing state (e.g., between liftoff and touchdown) of a step. In this example, while the foot 504 is in the air, gravity exerts downward force on the foot 504, which may cause slight clockwise rotation of the foot 504. Such clockwise rotation may cause the piston 518 to move slightly upward, and hydraulic fluid may be drained or pushed through the hydraulic line 538 and the orifice 604, to the hydraulic supply line 528. In response to motion of the piston 518 upward, the piston 512 moves slightly downward and the hydraulic supply line 528 provides hydraulic fluid through the orifice 602 and the hydraulic line 536 to fill the chamber 514. In this configuration as well, no high pressure fluid is consumed from the pressure source. Instead, fluid discharges from one chamber to the hydraulic supply line 528, and fluid is drawn from the hydraulic supply line 528 into the other chamber. Therefore, no power is consumed from the pressure source 526.

Further, although FIGS. 5A-6G illustrates controlling pitch motion of the foot 504, a similar configuration can be implemented to control roll and yaw motions of the foot 504. FIG. 6H illustrates control of roll motion of the foot 504. Particularly, FIG. 6H shows a back view of the leg of the robot. As depicted the valve configuration 600 can be used to control hydraulic actuator cylinders 614 and 616. If the controller seeks to command a clockwise roll motion of the foot 504, the controller may open the orifice 602 and the orifice 606, while closing the orifice 604 and the orifice 608. In response, a piston 618 of the hydraulic actuator cylinder 614 may extend, and a piston 620 of the hydraulic actuator cylinder 616 may retract causing the clockwise roll motion of the foot 504. Similarly, opening the orifice 604 and the orifice 608, while closing the orifice 602 and the orifice 606 causes counter-clockwise roll motion of the foot 504. The energy savings configurations shown in FIGS. 6B-6G can also be implemented with respect to the roll motion control configuration shown in FIG. 6H.

Figure 6H:
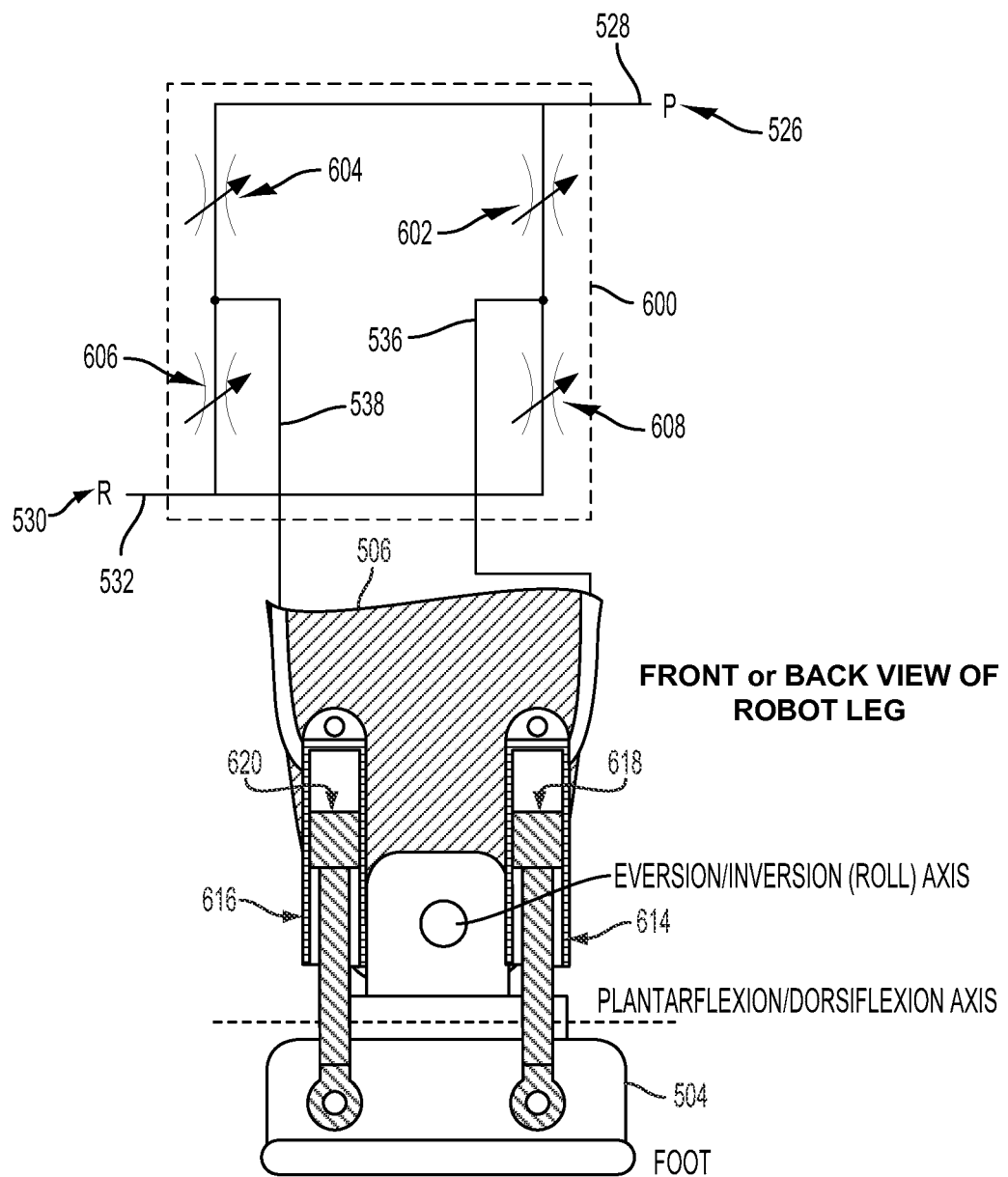
Figure 6I:
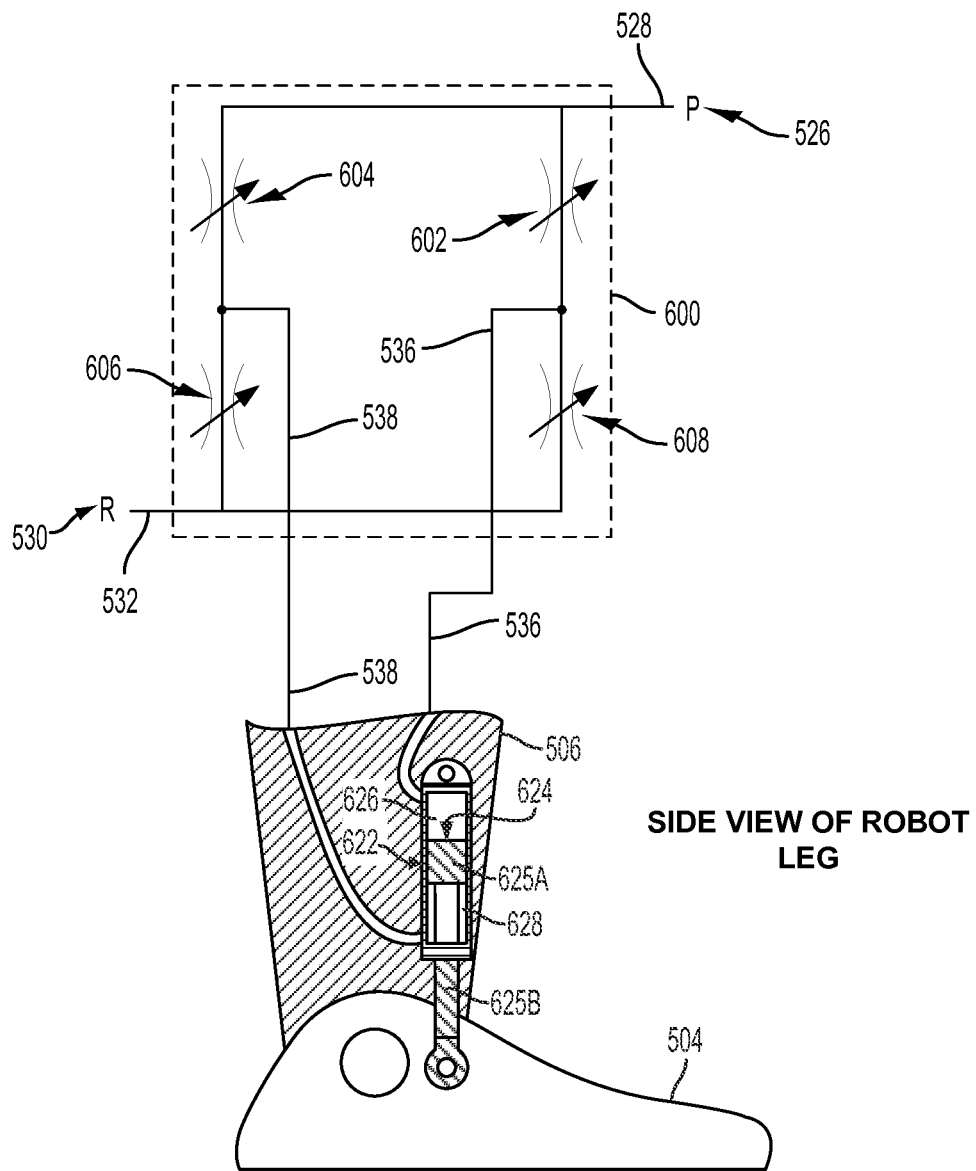

FIG. 6H depicts the valve configuration 600 also shown in FIG. 6A-6G. However, a separate valve configuration 600 may be implemented to control each of the roll motion and the pitch motion of the foot 504. Thus, the robot may have one more sets of valve configurations 600 to control each respective degree of freedom (e.g., pitch, roll, and yaw of the foot 504 or other members of the robot).

FIGS. 5A-6H depict the hydraulic actuator cylinders 508 and 510 as single-acting cylinders. However, the systems and method described herein can be implemented using one double-acting hydraulic actuator cylinder that can be powered in two directions and thus replaces the two single-acting cylinders. FIG. 6I illustrate a double-acting hydraulic actuator cylinder 622 controlling the foot 504, in accordance with an example implementation. The hydraulic actuator cylinder 622 includes a piston 624 slidably accommodated in the hydraulic actuator cylinder 622. The piston 624 includes a piston head 625A and a rod 625B extending from the piston head 625A along a central axis direction of the hydraulic actuator cylinder 622. The inside of the hydraulic actuator cylinder 622 is divided into a first chamber 626 and a second chamber 628 by the piston head 625A.

The controller may open the orifice 602 and the orifice 606 (and close the orifices 604 and 608) to provide high pressure hydraulic fluid from the pressure source 526 to the chamber 626 through the orifice 602 and the hydraulic line 536, while low pressure fluid may be pushed out of the chamber 628 through the hydraulic line 538 and the orifice 606 to the reservoir 530. High pressure fluid into the chamber 626 causes the piston 624 to extend (move downward), and thus cause the foot 504 to rotate clockwise. Similarly, the controller may open the orifice 604 and the orifice 608 (and close the orifices 602 and 606) to provide high pressure hydraulic fluid from the pressure source 526 to the chamber 628 through the orifice 604 and the hydraulic line 538, while low pressure fluid may be pushed out of the chamber 626 through the hydraulic line 536 and the orifice 608 to the reservoir 530. High pressure fluid into the chamber 628 causes the piston 624 to retract (move upward), and thus cause the foot 504 to rotate counter-clockwise. In this manner, the double-acting hydraulic actuator cylinder 622 could replace the two single-acting hydraulic actuator cylinders 508 and 510.

V. EXAMPLE TORQUE-VELOCITY SPACE

Figure 7:
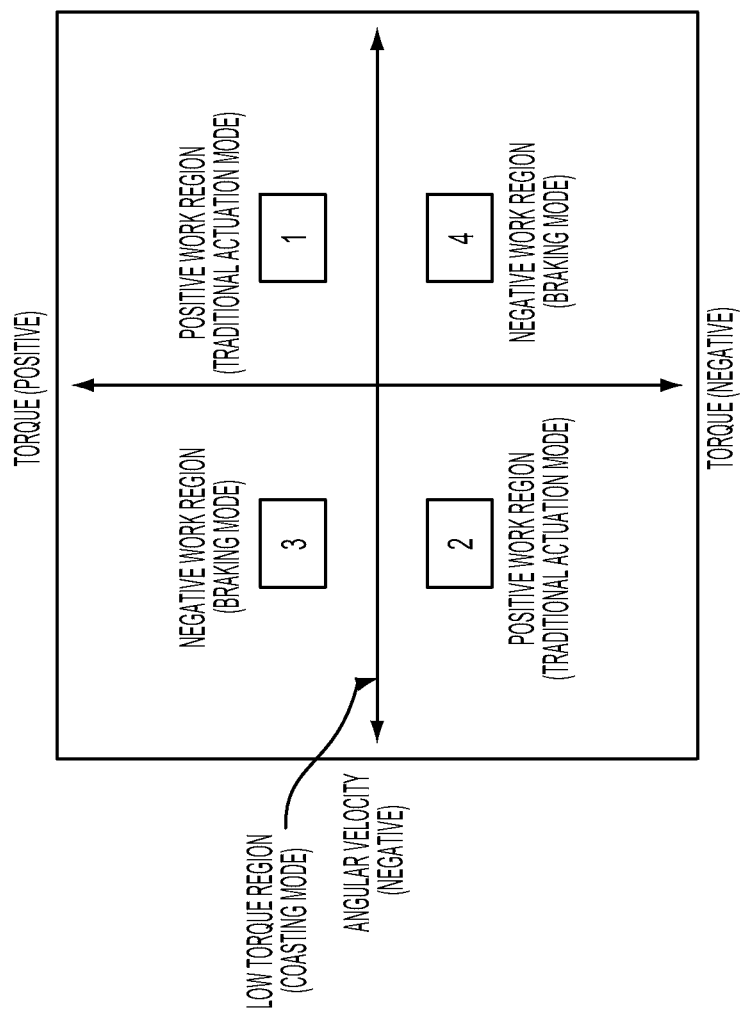
FIG. 7 illustrates torque-velocity space, in accordance with an example implementation.

FIG. 7 illustrates torque-velocity space, in accordance with an example implementation. As described above in FIGS. 6A-6I, the valve system 600 is capable of controlling motion of the foot 504 in different circumstances. In the following description, counter-clockwise rotation of the foot 504 corresponds to positive angular velocity, while clockwise rotation of the foot 504 corresponds to negative angular velocity.

In an example, referring to FIG. 6A, if the controller seeks to rotate the foot 504 in a counter-clockwise direction, the controller may open the orifice 604 and the orifice 608, while closing the orifice 602 and the orifice 606, to cause the piston 518 to move downward and the piston 512 to move upward. Motion of the pistons 512 and 518 causes a positive torque to be applied to the foot 504 to cause the foot 504 to rotate in a counter-clockwise direction. This example corresponds to operating in quadrant '1' of FIG. 7, where both the torque and the angular velocity are positive.

In another example, if the controller seeks to rotate the foot 504 in a clockwise direction (e.g., to push against a surface and lift off the foot 504), the controller may open the orifice 602 and the orifice 606, while closing the orifice 604 and the orifice 608. In response, the piston 512 moves downward and the piston 518 moves upward, and a negative torque is applied to the foot 504 to cause the foot 504 to rotate in a clockwise direction. This example corresponds to operating in quadrant '2' of FIG. 7, where both the torque and the angular velocity are negative.

As described above, the valve system 600 is also capable of operating the foot 504 efficiently in negative energy situations, i.e., when the foot 504 is moving in the opposite direction of the desired force. For instance, when the robot leg having the foot 504 and the shin 506 initiates ground contact, a heel of the foot 504 may touch the ground first. The controller may then cause the foot 504 to rotate clockwise to match a sole of foot with a plane of the ground while decelerating the robot, i.e., exerting negative work to decelerate the robot. In this case, the controller may open, at least partially, the orifice 606 and the orifice 608 while closing the orifice 602 and the orifice 604 (or alternatively open the orifice 602 and the orifice 604 while closing the orifice 606 and the orifice 608) to operate the foot 504 in braking mode, i.e., exert a braking torque on the foot 504, and controllably rotate the foot 504 clockwise until the sole of the foot 504 matches the plane of the ground. Accordingly, the braking torque is a positive torque, as the torque is applied by the pistons 512 and 518 in a counter-clockwise direction. This situation corresponds to operating in quadrant '3' in FIG. 7. Quadrant 4 corresponds to a situation similar to that of quadrant '3,' with the torque and angular velocity being opposite those of quadrant '3.'

Thus, in quadrants '3' and '4,' no hydraulic power is consumed from the pressure source 526, as the controller operates the valve system 600 to brake motion of the foot 504 without consuming high pressure hydraulic fluid from the pressure source 526. In this manner, the valve system 600 provides for efficient control of the foot 504.

VI. EXAMPLE VALVE SYSTEMS

Figure 8:
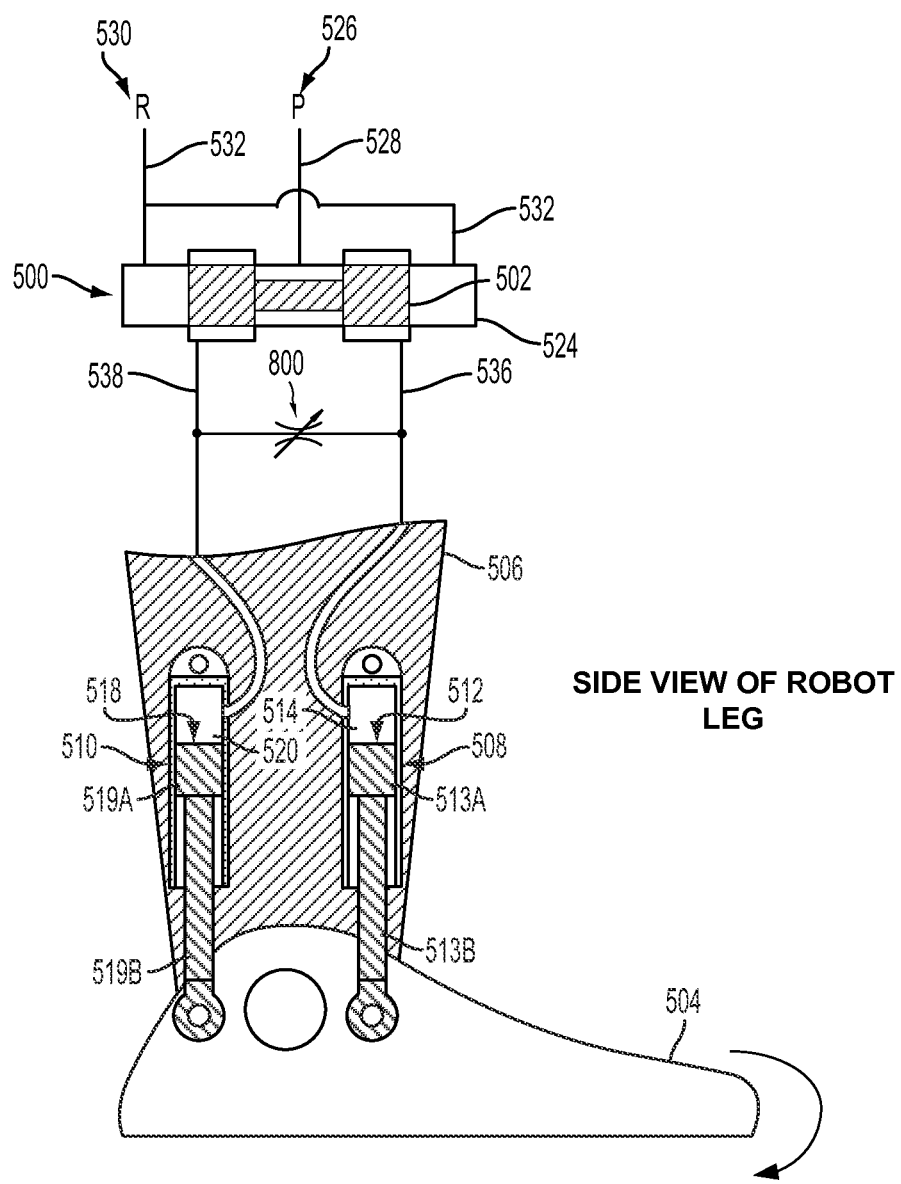
FIG. 8 illustrates a combination of a four-way valve and a two-way valve controlling a foot of a robot, in accordance with an example implementation.

Several valve configurations can be used to implement or realize operation of the valve system 600. For example, FIG. 8 illustrates a combination of the four-way valve 500 and a two-way valve controlling the foot 504 of a robot, in accordance with an example implementation. The two-way valve is depicted as an orifice 800. The two-way valve can be any type of two-way valve such as a two-way spool valve or a poppet valve, or any other type of two-way valves. When the spool 502 is in null position, and thus all ports of the valve 500 are closed, the orifice 800 representing the two-way valve can be opened to directly connect the chamber 514 to the chamber 520. In this manner, the orifice 800 can function as a combination of the orifice 606 and the orifice 608, and the foot 504 can be controlled in braking or coasting mode without consuming high pressure fluid.

Figure 9A:
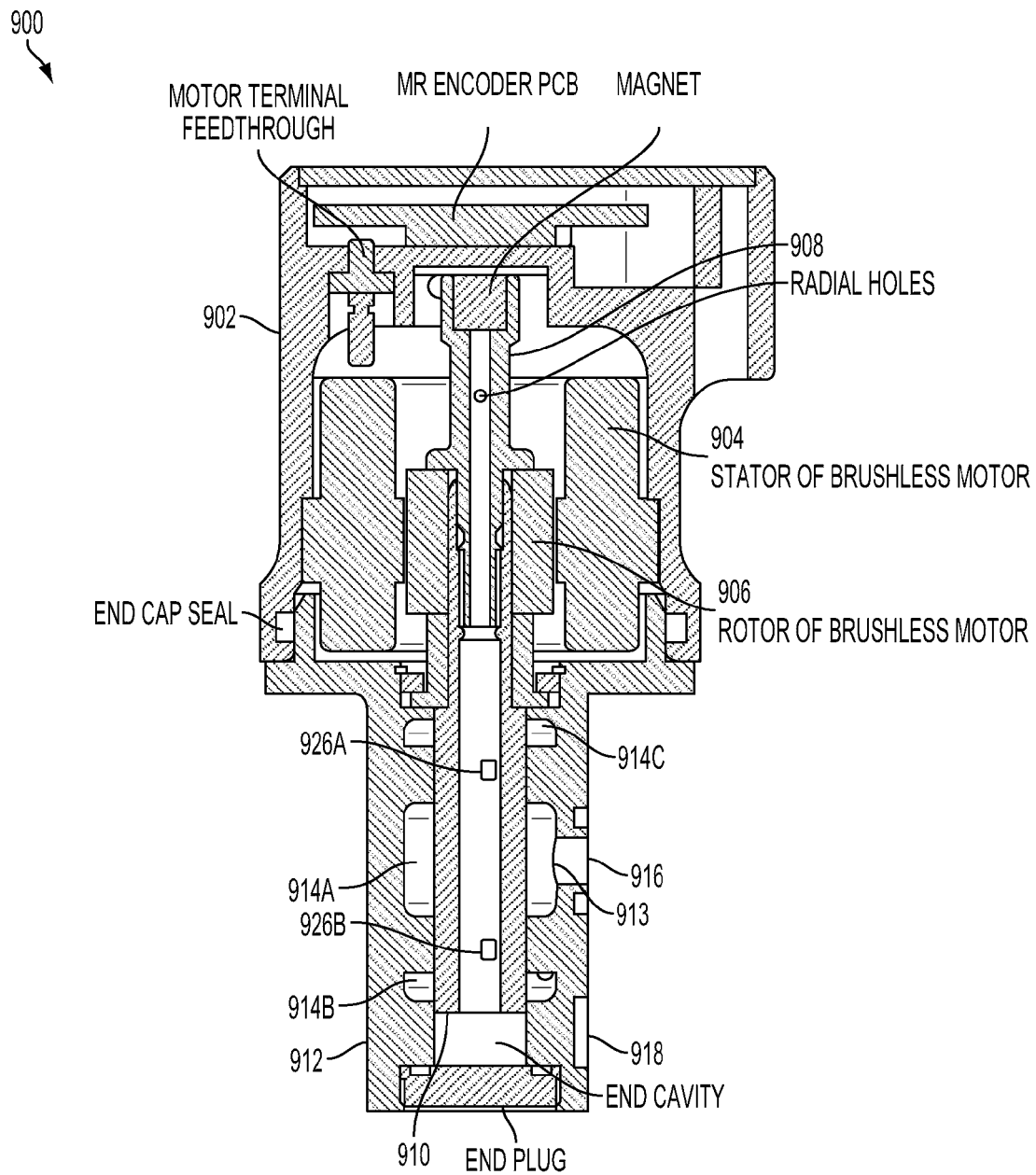
FIG. 9A illustrates a cross section of a rotary valve, in accordance with an example implementation.

FIGS. 9A-9E illustrate another valve configuration that can be used to implement the valve system 600. FIG. 9A illustrates a cross section of a rotary valve 900, in accordance with an example implementation. The valve 900 is a manifold style four-way valve. The rotary valve 900 may include a housing or end cap 902 that houses a rotary actuator such as a brushless direct current (DC) motor including a stator 904 and a rotor 906. A rotor bolt 908 is coupled to and configured to rotate with the rotor 906. A spool 910 is coupled to and configured to rotate with the rotor 906.

The spool 910 is rotatable within a valve body or sleeve 912. The terms "valve body" and "sleeve" are used interchangeably herein. The sleeve 912 may have a plurality of openings such as opening 913 configured along a length of the sleeve 912. The openings may be disposed in annular grooves such as annular grooves 914A, 914B, and 914C. The openings may be arranged axially along the sleeve 912.

Figure 9B:
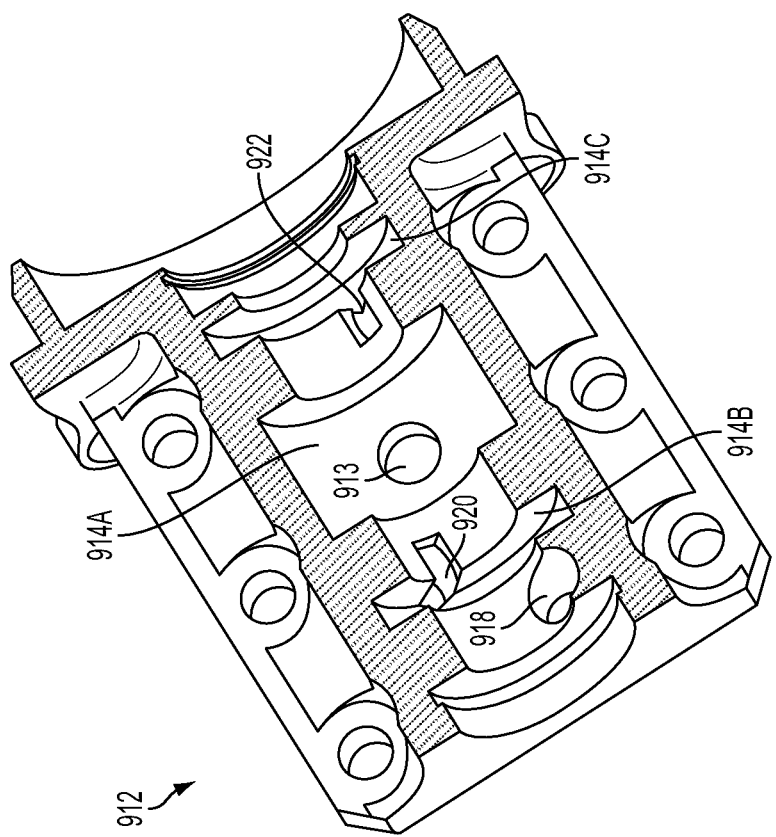
FIG. 9B illustrates a cross section of a valve body or sleeve of the valve illustrated in FIG. 9A, in accordance with an example implementation.

FIG. 9B illustrates a cross section of the valve body or sleeve 912, in accordance with an example implementation. As shown in FIG. 9B, the sleeve 912 may include the opening 913 associated with the annular groove 914A. The opening 913 may be configured to receive pressurized fluid from a hydraulic supply line at a port 916 shown in FIG. 9A. The sleeve 912 may also include a return port 918. The return port 918 may be configured to communicate fluid to a low pressure reservoir or tank. The sleeve 912 may further include an opening 920 configured to communicate fluid through the annular groove 914B to and from a first chamber, e.g., the chamber 520, of the hydraulic actuator cylinder

510. The sleeve 912 may further include an opening 922 configured to communicate fluid through the annular groove 914C to and from a second chamber, e.g., the chamber 514, of the hydraulic actuator cylinder 508. The openings 920 and 922 may be referred to as T-slots because they form T-shaped openings with the annular grooves 914B and 914C, respectively.

The opening 920 may have a corresponding opening on the other side of the sleeve 912, and the opening 922 may have a corresponding opening on the other side of the sleeve 912. In this manner, the openings 920 and 922 and their corresponding openings form an array of openings that balances radial pressure forces acting on the spool 910, and thus minimizes friction that the spool 910 experiences as the spool 910 rotates within the sleeve 912. In one example, the openings 920 and 922 and the corresponding openings may be 180° opposed. In another example, three openings may be disposed along the circumference of the spool 910 space 120° apart from each other. Other examples are possible. Reference herein to one of these openings (e.g., the opening 920 or the opening 922) includes reference to the opening and the corresponding opening(s) on the other side of the sleeve 912.

Figure 9C:
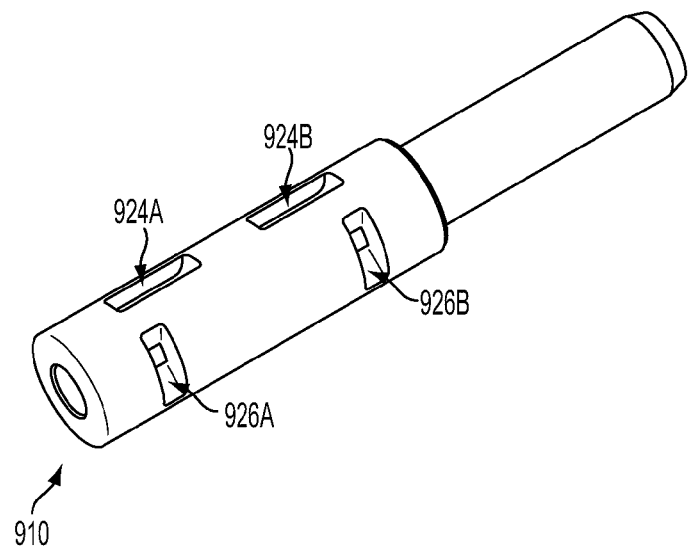
FIG. 9C illustrates a spool of the valve illustrated in FIG. 9A, in accordance with an example implementation.

The spool 910 shown in FIG. 9A may include a respective plurality of openings along a length of the spool 910 corresponding to the plurality of openings of the sleeve 912. FIG. 9C illustrates the spool 910, in accordance with an example implementation. As shown in FIG. 9C, the spool 910 could be hollow, and may have openings such as axial grooves 924A and 924B and windows 926A and 926B. On the other side of the spool 910 that is not shown in FIG. 9C, the spool 910 may also include axial grooves and windows. For example, the spool 910 may include windows corresponding to the windows 926A and 926B and located at an opposite side (e.g., 180° apart not shown in FIG. 9C) of the spool 910 from the windows 926A and 926B. In examples, multiple windows similar to the windows 926A and 926B may be disposed along the circumference of the spool 910. For example, N windows such as the window 926A may be disposed along the circumference of the spool 910 spaced 360°/N apart from each other. Also, the spool 910 may include axial grooves corresponding to the axial grooves 924A and 924B and located at an opposite side of the spool 910 from the axial grooves 924A and 924B. Having axial grooves and windows in such arrangement may help balance forces applied on the spool 910 by hydraulic fluid during operation of the valve 900. Reference herein to a window of the windows 926A and 926B includes reference to the windows 926A or 926B shown in FIG. 9C and the corresponding window (or array of windows disposed along the circumference of the spool 910, i.e., disposed in a circular manner about a longitudinal axis of the spool) on the other side of the spool 910 not shown in FIG. 9C. For instance, reference to the window 926A includes reference to the window 926A and the corresponding window on the other side of the spool 910 that is not shown in FIG. 9C. Similarly, reference herein to an axial groove of the axial grooves 924A and 924B includes reference to the axial groove 924A or 924B and the corresponding axial groove on the other side of the spool 910.

The rotary actuator (e.g., motor) coupled to the spool 910 may be configured to rotate the spool 910 within the sleeve 912 in a clockwise or a counter-clockwise direction. Rotating the spool 910 to a given position or angle may cause at least a partial alignment between the grooves and windows of the spool 910 with the openings (e.g., the annular groove 914A and the T-slots 920 and 922) of the sleeve 912.

Figure 9D:
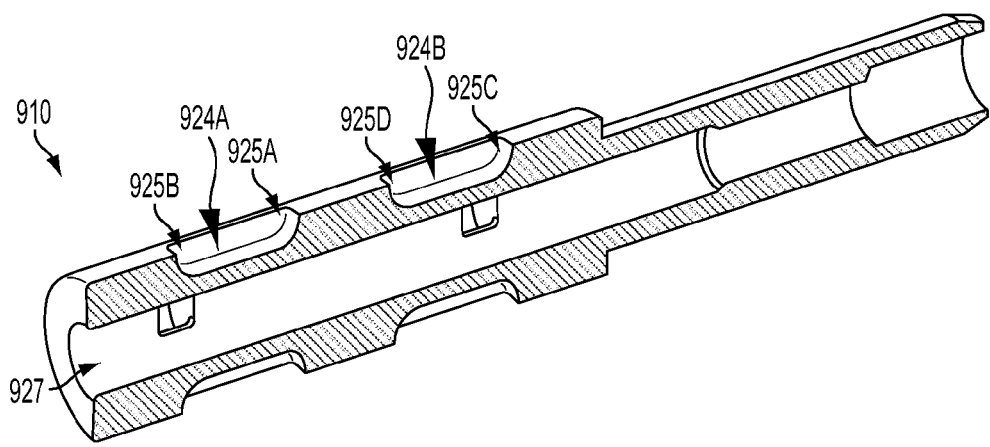
FIG. 9D illustrates a cross section of the spool illustrated in FIG. 9C, in accordance with an example implementation.

FIG. 9D illustrates a cross section of the spool 910, in accordance with an example implementation. The spool 910 is hollow and has inner chamber 927. As shown in FIG. 9D, the axial grooves 924A and 924B are not through-holes and do not reach the inner chamber 927 of the spool 910. The axial groove 924A has a first end 925A and a second end 925B, and the axial groove 924B has a first end 925C and a second end 925D. The groove 914A (shown in FIGS. 9A and 9B) overlaps the first end 925A of the axial groove 924A, and overlaps the second end 925D of the axial groove 924B. In this configuration, the axial grooves 924A and 924B contain, or have access to, pressurized fluid received through the opening 913 and the groove 914A in the sleeve 912.

Figure 9E:
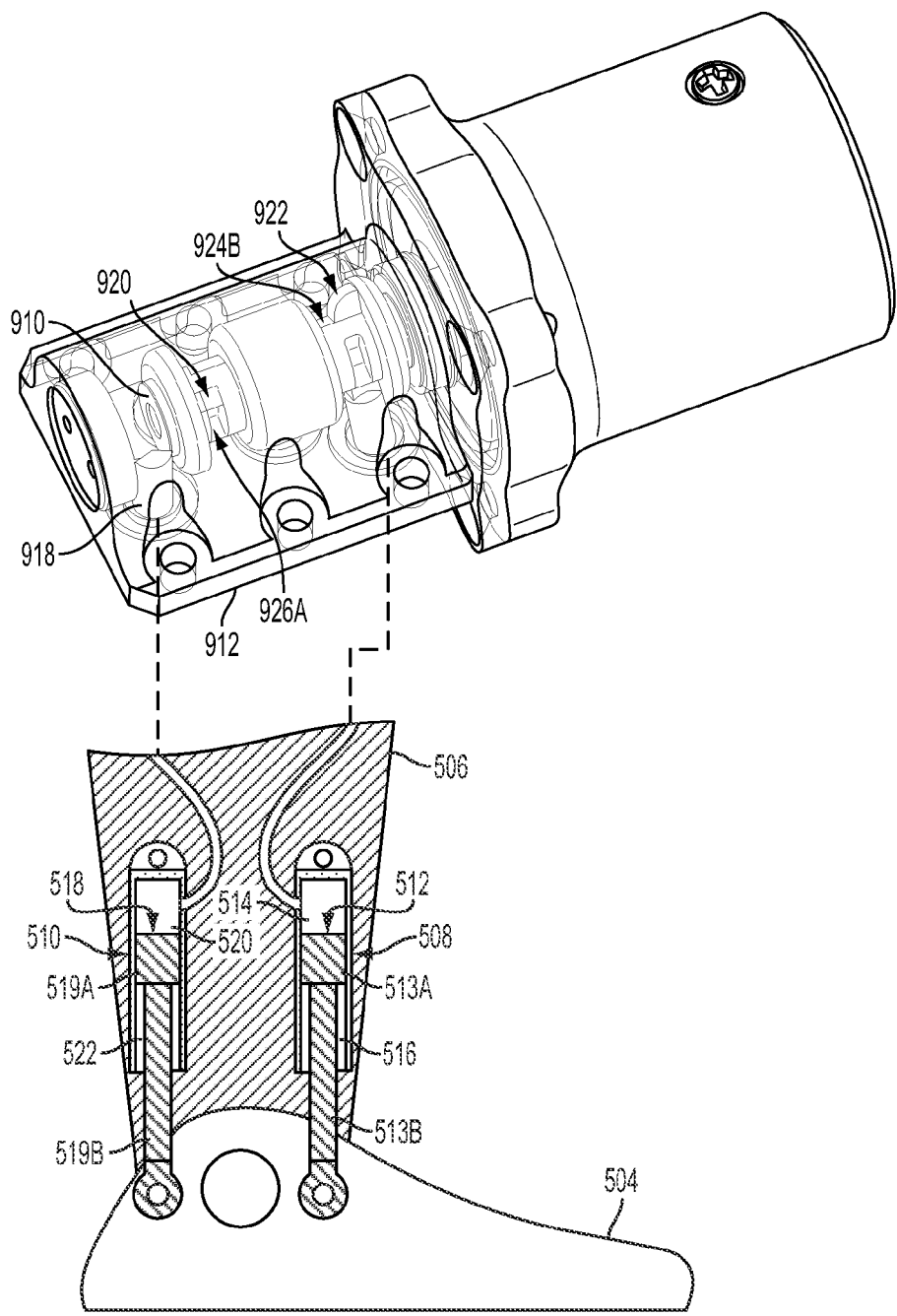
FIG. 9E illustrates the valve illustrated in FIGS. 9A-9D with the valve body made transparent, and while the spool is in a given rotary position/angle, in accordance with an example implementation.

FIG. 9E illustrates the valve 900 while the spool 910 is in a given rotary position/angle, in accordance with an example implementation. The valve body or sleeve 912 is shown transparent in FIG. 9E to illustrate the details of the spool 910 and the sleeve 912.

In the given rotary position, fluid received from the hydraulic supply line through the port 916 and the groove 914A in the sleeve 912 is communicated to the axial grooves 924A (specifically, the first end 925A) and 924B (specifically, the second end 925D). While the spool 910 is in the given rotary position, the first end 925C of the axial groove 924B may be aligned, at least partially, with the T-slot 922 in the sleeve 912. The fluid is thus communicated through the T-slot 922 through the annular groove 914C to the chamber 514 of the hydraulic actuator cylinder 508 to push the piston 512 downward. Thus, alignment between the axial groove 924B with the T-slot 922 form an opening that corresponds to the orifice 602 of the valve system 600.

Further, at the given rotary position of the spool 910, fluid that is forced out of the chamber 520 is communicated through T-slot 920 in the sleeve 912, which may be at least partially aligned with the window 926A in the spool. Fluid going through the window 926A is communicated through the inner chamber 927 of the spool 910, through the return port 918 (shown in FIGS. 9A and 9B) of the sleeve 912, to the reservoir or tank. Thus, alignment between the T-slot 920 and the window 926A form an opening that corresponds to the orifice 606 of the valve system 600. In a similar manner, rotating the spool 910 to a different rotary position can cause the spool 910 and the sleeve 912 to form openings corresponding to the orifice 604 and the orifice 608 of the valve system 600.

The valve configurations shown in FIGS. 8 and 9A-9E are example configurations for illustration only, and other valve configurations are contemplated that can realize or implement the valve system 600. For example, four separate valves can be used to function as the respective orifices 602, 604, 606, and 608. Such a configuration may be referred to as a separate or independent metering configuration because each orifice can be controlled independently. In this example, the controller may be configured to provide signals to at least two of the four valves, while keeping the other two valves closed, to cause the foot 504 to rotate. Specifically, the controller may send a first signal to a first valve of the four valves and a second signal to a second valve of the four valves.

VII. EXAMPLE METHODS

Figure 10:
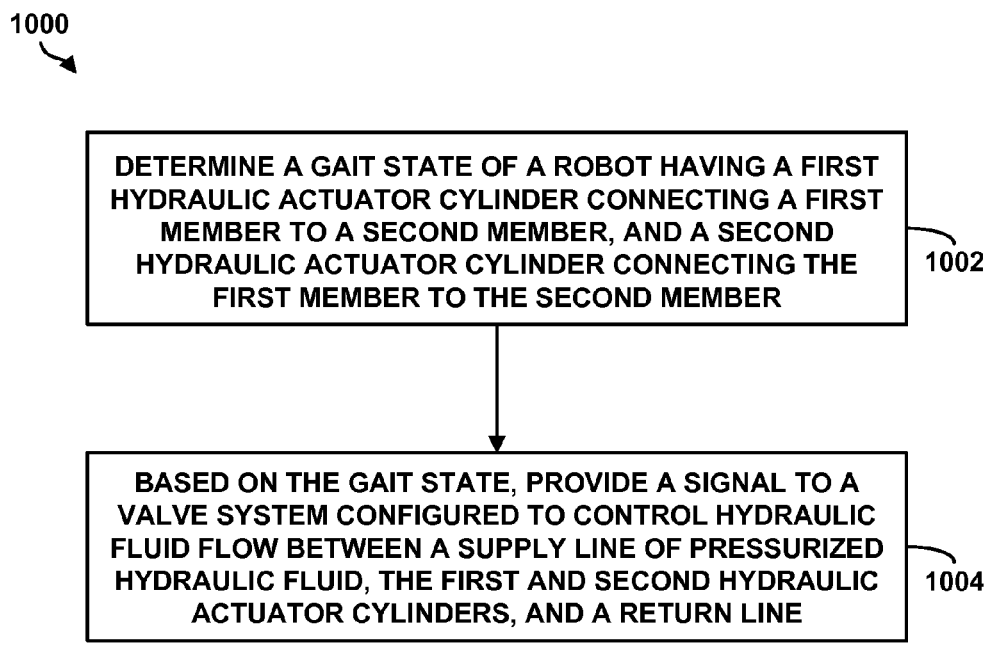
FIG. 10 is a flow chart illustrating operations for passive ankle control, in accordance with an example implementation.

FIG. 10 is a flow chart 1000 illustrating operations for passive ankle control, in accordance with an example implementation. The flow chart 1000 may include one or more operations, or actions as illustrated by one or more of blocks 1002-1004. These operations can be implemented in the context of the robotic system 100, and the robot 200, 300, and 400 by any of the controllers (e.g., the controller 108, 202, etc.) described above, and may involve any of the valve configurations, states, and arrangements of FIGS. 1-9E.

Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, the flow chart 1000 shows operation of one possible implementation. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example. The computer-readable medium, the processor, the program code may all be included within a controller of a valve. In addition, each block in FIG. 10 may represent circuitry that is wired to perform the specific logical operations in the process.

At block 1002, a controller of a robot determines a gait state of a robot having a first hydraulic actuator cylinder connecting a first member to a second member, and a second hydraulic actuator cylinder connecting the first member to the second member. In line with the discussion above, the robot includes a first member such as the foot 504 of a leg of the robot connected to a second member such as the shin 506 of the leg via a joint. The first hydraulic actuator cylinder, such as the hydraulic actuator cylinder 508, connects the first member to the second member. The first hydraulic actuator cylinder comprises a first piston (the piston 512) and a first chamber (the chamber 514). The second hydraulic actuator cylinder, such as the hydraulic actuator cylinder 510, connects the first member to the second member. The second hydraulic actuator cylinder comprises a second piston (the piston 518) and a second chamber (the chamber 520). In an example, motion of either the first piston or the second piston in a given direction is accompanied by motion of the other piston in an opposite direction resulting in rotation of the first member about the joint relative to the second member.

Also in line with the discussion above, when the robot is walking or running, each leg of the robot goes through several phases for each step the robot takes. For instance, in one phase, the foot 504 may be on the surface on which the robot is moving and may be pushing against the surface so as to liftoff the leg from the surface. In another phase, after liftoff, the foot 504 may be in a swing state. In still another phase, the foot 504 may touch down on the surface. The controller may determine the gait state of the robot and thus determine the phase of a step that the robot is taking.

Referring back to FIG. 10, at block 1004, the controller provides, based on the gait state, a signal to a valve system configured to control hydraulic fluid flow between a supply line of pressurized hydraulic fluid, the first and second hydraulic actuator cylinders, and a return line. For instance, referring to FIG. 6A, the robot includes a valve system such as the valve system 600 configured to: (i) couple a supply line of pressurized hydraulic fluid to the first chamber, (ii) couple the supply line to the second chamber, (iii) couple the first chamber to a return line, and (iv) couple the second chamber to the return line. The valve system may also be configured to couple both the first and second chambers to either the supply line or the return line.

Based on the gait state, the controller provides the signal to the valve system to select whether to (i) connect the first chamber to the supply line and connect the second chamber to the return line, (ii) connect the second chamber to the supply line and connect the first chamber to the return line, or (iii) connect both the first chamber and the second chamber to the return line. In an example, the signal may open the orifice 602 and the orifice 606 (while the orifices 604 and 608 are closed) so as to cause the foot 504 to rotate clockwise (e.g., to lift off the foot 504 from a surface). In another example, the signal may open the orifice 604 and the orifice 608 (while the orifices 602 and 606 are closed) so as to cause the foot 504 to rotate counter-clockwise.

In still another example, if the foot 504 is not required to perform an active function (e.g., when the leg is in swing state), the signal may open the orifice 606 and the orifice 608 (while the orifices 602 and 604 are closed). In this manner, both the chamber 514 and 520 are connected to the hydraulic return line 532 to save energy when no active function is required. Alternatively, the signal may open the orifice 602 and the orifice 604 (while the orifices 606 and 608 are closed) so as to connect both the chamber 514 and 520 to the hydraulic supply line 526 to save energy when no active function is required.

In the description above, the first and second members of the robot are depicted as a foot and a shin of a leg of the robot. However, the systems and methods described herein can be applied to any two members of the robot. Further, the hydraulic actuators described throughout the disclosure are hydraulic actuator cylinders. However, the systems and methods described herein can be applied to hydraulic motors as well. Such hydraulic motors are mechanical actuators that convert hydraulic pressure and flow into torque and angular displacement/rotation of a joint that causes rotation of a member of the robot relative to another member.

VIII. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A robot comprising:
   a first hydraulic actuator cylinder connecting a first member to a second member, wherein the first hydraulic actuator cylinder comprises a first piston and a first chamber;
   a second hydraulic actuator cylinder connecting the first member to the second member, wherein the second hydraulic actuator cylinder comprises a second piston and a second chamber;
   a valve system comprising a rotary valve that includes a sleeve, a spool rotatable within the sleeve, and a rotary actuator coupled to the spool for rotation the spool within the sleeve, wherein the valve system is configured to: (i) couple a supply line of pressurized hydraulic fluid to the first chamber, (ii) couple the supply line to the second chamber, (iii) couple the first chamber to a return line, and (iv) couple the second chamber to the return line; and
   a controller configured to:
   determine a gait state of the robot, and
   based on the determined gait state, provide a signal to the valve system to select whether to (i) connect the first chamber to the supply line and connect the second chamber to the return line, (ii) connect the second chamber to the supply lint and connect the first chamber to the return line, or (iii) connect both the first chamber and the second chamber to the return line.

2. The robot of claim 1, wherein motion of either the first piston or the second piston in a given direction is accompanied by motion of the other piston in an opposite direction resulting in rotation of the first member about a joint relative to the second member.

3. The robot of claim 1, wherein the robot includes a leg, and wherein the first member is a foot of the leg and the second member is a shin of the leg.

4. The robot of claim 3, wherein the controller is further configured to:
   determine, based on the determined gait state, whether the leg is in a liftoff phase, a swing phase, or a touchdown phase, wherein the controller is configured to provide the signal based on whether the at least one leg is in the liftoff phase, the swing phase, or the touchdown phase.

5. The robot of claim 4, wherein the controller determines that the at least one leg is in a swing phase or a stance position, and where the controller is configured to, in response to the leg being in the swing phase or the stance position, provide the signal to the valve system to connect both the first chamber and the second chamber to the return line.

6. The robot of claim 1, wherein the sleeve has a plurality of openings configured along a length of the sleeve, wherein the plurality of openings includes at least a first opening configured to receive pressurized fluid from the supply line, a second opening configured to communicate fluid to the return line, a third opening configured to communicate fluid to and from the first chamber, and a fourth opening configured to communicate fluid to and from the second chamber.

7. The robot of claim 6, wherein the spool includes a respective plurality of openings along a length of the spool corresponding to the plurality of openings of the sleeve.

8. The robot of claim 7, wherein the rotary actuator is configured to rotate the spool, based on the signal, to a given rotary position in a clockwise or a counter-clockwise direction to cause at least a partial alignment between a subset of the respective plurality of openings of the spool and a subset of the plurality of openings of the sleeve to: (i) connect one of the first chamber and the second chamber of the hydraulic actuator to the supply line, and connect the other chamber to the return line, or (ii) connect both the first chamber and the second chamber of the hydraulic actuator to the return line or the supply line.

9. A method comprising:
   determining, by a controller of a robot, a gait state of the robot, wherein the robot includes a first hydraulic actuator cylinder connecting a first member to a second member, wherein the first hydraulic actuator cylinder comprises a first piston and a first chamber, wherein a second hydraulic, actuator cylinder connects the first member to the second member, wherein the second hydraulic actuator cylinder comprises a second piston and a second chamber, wherein the robot includes a valve system configured to: (i) couple a supply line of pressurized hydraulic fluid to the first chamber, (ii) couple the supply line to the second chamber, (iii) couple the first chamber to a return line, and (iv) couple the second chamber to the return line, and wherein the valve system is further configured to couple the first chamber and the second chamber to the supply line; and
   based on the gait state, providing, by the controller, a signal to the valve system to select whether to (i) connect the first chamber to the supply line and connect the second chamber to the return line, (ii) connect the second chamber to the supply line and connect the first chamber to the return line, or (iii) connect both the first chamber and the second chamber to the return line.

10. The method of claim 9, wherein motion of either the first piston or the second piston in a given direction is accompanied by motion of the other piston in an opposite direction resulting in rotation of the first member about a joint relative to the second member.

11. The method of claim 9, wherein the robot includes a leg, and wherein the first member is a foot of the leg and the second member is a shin of the leg.

12. The method of claim 11, further comprising:
    determining, based on the determined gait state, whether the leg is in a liftoff phase, a swing phase, or a touchdown phase, wherein providing the signal is based on whether the leg is in the liftoff phase, the swing phase, or the touchdown phase.

13. The method of claim 12, wherein, when the leg is in a swing phase, providing the signal causes the valve system to connect both the first chamber and the second chamber to the return line.

14. A non-transitory computer readable medium having stored therein instructions that, in response to execution by a controller of a robot, cause the controller to perform operations comprising: determining a gait state of the robot, wherein the robot includes a first hydraulic actuator cylinder connecting a first member to a second member, wherein the first hydraulic, actuator cylinder comprises a first piston and a first chamber, wherein a second hydraulic actuator cylinder connects the first member to the second member, wherein the second hydraulic actuator cylinder comprises a second piston and a second chamber, wherein the robot includes a valve system configured to: (i) couple a supply line of pressurized hydraulic fluid to the first chamber, (ii) couple the supply line to the second chamber, (iii) couple the first chamber to a return line, and (iv) couple the second chamber to the return line, and wherein the valve system is further configured to couple the first chamber and the second chamber to the supply line; and based on the gait state, providing a signal to the valve system to select whether to (i) connect the first chamber to the supply line and connect the second chamber to the return line, (ii) connect the second chamber to the supply line and connect the first chamber to the return line, or (iii) connect both the first chamber and the second chamber to the return line.

15. The non-transitory computer readable medium of claim 14, wherein providing the signal comprises providing the signal to select whether to connect both the first chamber and the second chamber to the supply line.

\* \* \* \* \*